US007382931B2

(12) United States Patent
Kang et al.

(10) Patent No.: US 7,382,931 B2
(45) Date of Patent: *Jun. 3, 2008

(54) SYSTEM AND PROCESS FOR GENERATING HIGH DYNAMIC RANGE VIDEO

(75) Inventors: Sing Bing Kang, Redmond, WA (US); Matthew Uyttendaele, Seattle, WA (US); Simon Winder, Seattle, WA (US); Richard Szeliski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 537 days.

This patent is subject to a terminal disclaimer.

(21) Appl. No.: 11/036,944

(22) Filed: Jan. 14, 2005

(65) Prior Publication Data

US 2005/0243177 A1 Nov. 3, 2005

Related U.S. Application Data

(63) Continuation of application No. 10/425,338, filed on Apr. 29, 2003, now Pat. No. 6,879,731.

(51) Int. Cl.
*G06K 9/40* (2006.01)
(52) U.S. Cl. ...................... 382/274; 382/284
(58) Field of Classification Search ............. 382/162, 382/194, 274, 284; 348/207.1
See application file for complete search history.

(56) References Cited

U.S. PATENT DOCUMENTS

| 5,828,793 | A | * | 10/1998 | Mann | 382/284 |
|---|---|---|---|---|---|
| 6,879,731 | B2 | * | 4/2005 | Kang et al. | 382/274 |
| 7,010,174 | B2 | * | 3/2006 | Kang et al. | 382/274 |
| 7,239,757 | B2 | * | 7/2007 | Kang et al. | 382/274 |

* cited by examiner

*Primary Examiner*—Duy M Dang
(74) *Attorney, Agent, or Firm*—Lyon & Harr, LLP; Richard T. Lyon

(57) ABSTRACT

A system and process for generating High Dynamic Range (HDR) video is presented which involves first capturing a video image sequence while varying the exposure so as to alternate between frames having a shorter and longer exposure. The exposure for each frame is set prior to it being captured as a function of the pixel brightness distribution in preceding frames. Next, for each frame of the video, the corresponding pixels between the frame under consideration and both preceding and subsequent frames are identified. For each corresponding pixel set, at least one pixel is identified as representing a trustworthy pixel. The pixel color information associated with the trustworthy pixels is then employed to compute a radiance value for each pixel set to form a radiance map. A tone mapping procedure can then be performed to convert the radiance map into an 8-bit representation of the HDR frame.

3 Claims, 29 Drawing Sheets

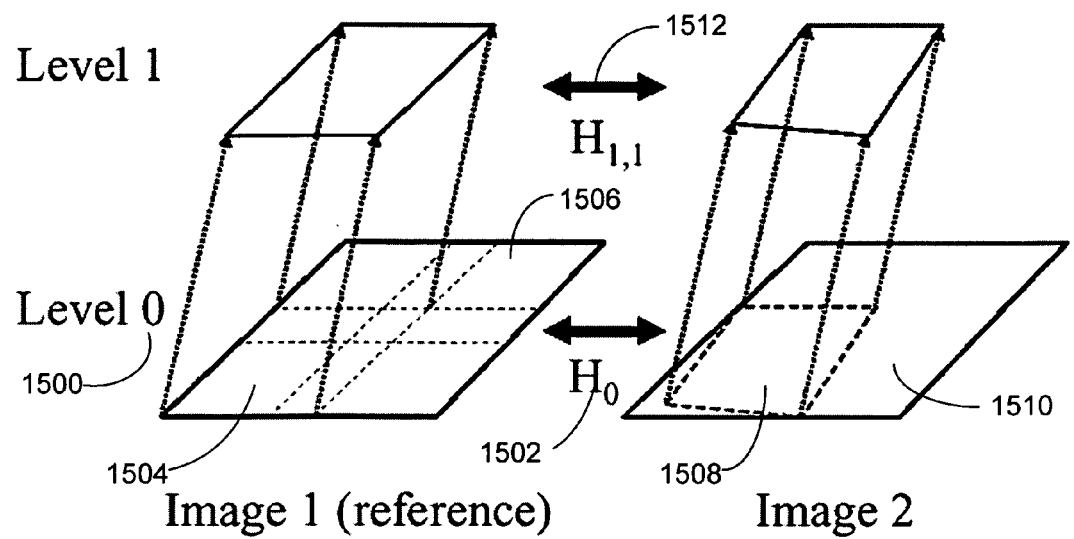
FIG. 15
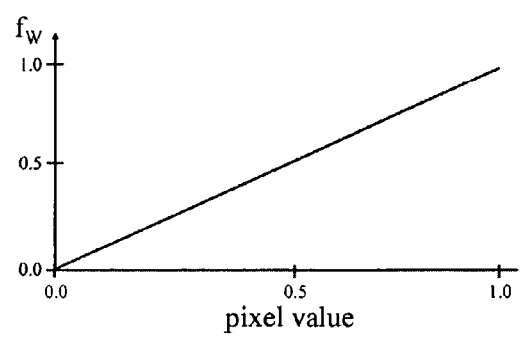 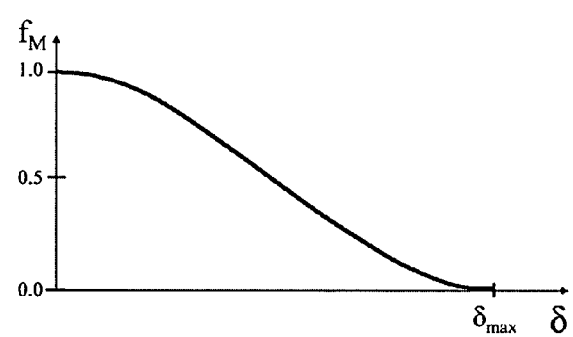
FIG. 18(a)  FIG. 18(b)

SYSTEM AND PROCESS FOR GENERATING HIGH DYNAMIC RANGE VIDEO

CROSS-REFERENCE TO RELATED APPLICATIONS

This application is a continuation of a prior application entitled "A SYSTEM AND PROCESS FOR GENERATING HIGH DYNAMIC RANGE VIDEO" which was assigned Ser. No. 10/425,338 and filed Apr. 29, 2003, and which subsequently issued as U.S. Pat. No. 6,879,731 on Apr. 12, 2005.

BACKGROUND

1. Technical Field

The invention is related to producing High Dynamic Range (HDR) video, and more particularly to a system and process for generating HDR video from a video image sequence captured while varying the exposure of each frame.

2. Background Art

The real world has a lot more brightness variation than can be captured by the sensors available in most cameras today. The radiance of a single scene may contain four orders of magnitude in brightness—from shadows to fully lit regions. Typical CCD or CMOS sensors only capture about 256-1024 brightness levels.

This limited dynamic range problem has inspired many solutions in recent years. One method of capturing the full radiance of a static scene is to take multiple exposures of the scene and then to combine them to create a High Dynamic Range (HDR) map [3, 7, 10]. The static scene requirement can be eliminated using multiple image detectors, novel sensors or spatially varying pixel exposures [8]. Mann et al. [6] register differently exposed frames using homographies, which allows them to estimate the camera response function and hence produce an HDR image from a panning video. Bogoni [1] extends the dynamic range of monochrome and color images by registering globally (using affine parameters) and then locally. However, details of the registration step and its robustness were not given.

Once an HDR image is computed, it must then be rendered to a display. Since typical displays are only able to yield about two orders of magnitude in brightness values, a contrast reduction must be performed on the HDR image. This so called tone mapping problem has recently been explored by a number of researchers [2, 4, 9].

However, none of these previous image-based methods is designed to efficiently create HDR video. Typical video footage captured using an off-the-shelf camcorder suffers from limited dynamic range. In addition, the prior methods would not allow a conventional video camera to be used to create HDR video. The present HDR video generation system and process remedies this problem.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for generating HDR video from an image sequence of a dynamic scene captured while rapidly varying the exposure using a conventional video camera which has undergone a simple reprogramming of the auto gain mechanism. This allows the use of inexpensive and high resolution camera sensors available today. In general, a high dynamic range (HDR) video is generated by taking frames of the precursor video captured at alternating long and short exposures over time and producing HDR video from these frames. In general, this is accomplished by first using a procedure that computes the exposure to be used to capture each frame of the precursor video that simultaneously attempts to satisfy two competing constraints. First, it is desired to keep the alternating exposure levels as close together as possible so as to reduce noise in mid-tones, while at the same time spreading the levels far enough apart to capture as wide a dynamic range as possible. The frames of the precursor video, which will typically have some inter-frame motion, are then composited to produce the aforementioned HDR video frames. In general, this entails doing motion estimates over a series of the alternating exposed frames of the precursor video to identify pixel correspondences over time, and then deciding how much to weight each pixel of each set of corresponding pixels based on both its exposure and the estimated quality of the motion estimates. The corresponding pixel sets are then combined based on their assigned weights to form a composited frame of the HDR video. In addition, a modified tone mapping technique can be employed for viewing purposes.

More particularly, the HDR video generation system and process first involves capturing a video image sequence while varying the exposure of each frame so as to alternate between frames exhibiting a shorter exposure and a longer exposure. In general, the exposure for each frame of the video image sequence is set prior to it being captured as a function of the pixel brightness distribution in preceding frames of the video. Next, for each frame of the video after a prescribed number of initiating frames, the corresponding pixels between the frame under consideration and both preceding and subsequent neighboring frames are identified. For each of the corresponding pixels sets, at least one pixel in the set is identified as representing a trustworthy pixel. The pixel color information associated with the trustworthy pixels is then employed to compute a radiance value for that set of pixels. This is repeated for each set of corresponding pixels to form a radiance map representing a frame of the HDR video. A tone mapping procedure can then be performed to convert the radiance map into an 8-bit representation of the HDR frame that is suitable for rendering and display.

The aforementioned setting of the exposure for each frame of the video image sequence is designed to set the exposures so that the exposure ratio between each sequential pair of long and short exposure frames is minimized while simultaneously producing a substantially full range of radiances for the scene depicted in the frames. This can be accomplished by first capturing the prescribed number of initiating frames (which is at least two) and computing respective intensity histograms for the last two frames of the video image sequence. It is then determined whether the exposure settings associated with the last two frames captured are equal. If so, it is further determined for each frame whether their over-exposed pixel count and under-exposed pixel count are less then a prescribed over-exposed pixel target count and under-exposed pixel target count, respectively. Whenever it is found that the counts are both less than their respective target counts, the exposure of a first of the next two frames to be captured is set to a value that would result in the intensity histogram associated with the first of the pair of previously-capture frames under consideration to be centered within the range of its pixel values. Similarly, the exposure of a second of the next two frames to be captured is set to a value that would result in the intensity histogram associated with the second of the pair of previously-capture frames under consideration to be centered within the range of its pixel values. Centering the intensity histogram involves multiplying the exposure value of the first or second previously-capture frame under consideration (as the case may be) by a ratio of the inverse of the camera response function at the median intensity value of a range of anticipated intensity values of the scene to the inverse of the camera response function at the intensity value representing the average of the intensity histogram of the first or second frame, respectively.

However, if it is determined that the exposure settings associated with the last two frames captured are not equal, or one or both frames of the pair of previously captured frames under consideration have an over-exposed pixel count or under-exposed pixel count that is more than or equal to the prescribed over-exposed pixel target count and under-exposed pixel target count, respectively, it is first determined whether the over-exposed pixel count is less than a prescribed percentage of the over-exposed pixel target count in the frame of the frame pair having the shorter exposure setting. If so, the exposure for the next shorter exposure frame to be captured is set to an exposure value representing an increase over the exposure value employed for the shorter exposure frame under consideration. It is noted that the over-exposed pixel count represents the number of saturated pixels and the over-exposed pixel target count is within a range of about 1 to 5 percent of the total number of pixels in the frame under consideration. As for setting the exposure for the next shorter exposure frame to be captured to an exposure value representing an increase over the exposure value employed for the shorter exposure frame under consideration, this entails multiplying the exposure value of shorter exposure frame under consideration by a ratio of the inverse of the camera response function at the intensity value representing a saturated pixel to the inverse of the camera response function at the intensity value representing the highest intensity value obtained among the first 99 percent of the pixels of the shorter exposure frame under consideration when ordered by intensity value starting with the smallest value.

It is next determined whether the under-exposed pixel count is less than a prescribed percentage of the under-exposed pixel target count in the frame of the pair of previously captured frames under consideration having the longer exposure setting. If so, the exposure for the next longer exposure frame to be captured is set to an exposure value representing a decrease over the exposure value employed for the longer exposure frame under consideration. In this case, the under-exposed pixel count represents the number of black pixels and the under-exposed pixel target count is within a range of about 1 to 5 percent of the total number of pixels in the frame under consideration. As for setting the exposure for the next longer exposure frame to be captured to an exposure value representing a decrease over the exposure value employed for the longer exposure frame under consideration, this entails multiplying the exposure value of the longer exposure frame under consideration by a ratio of the inverse of the camera response function at the intensity value representing a black pixel to the inverse of the camera response function at the intensity value representing the highest intensity value obtained among the first one percent of the pixels of the longer exposure frame under consideration when ordered by intensity value starting with the smallest value.

Once the exposures for the next shorter and longer exposure frames have been tentatively set, it is determined whether the ratio of these new exposure values is greater than or equal to a prescribed maximum allowed exposure ratio. Whenever it is found that the ratio is greater than or equal to the prescribed maximum allowed exposure ratio, the exposure values are re-set. This is accomplished by balancing the over-exposed pixel count associated with the shorter exposure frame under consideration with the under-exposure pixel count associated with the longer exposure frame under consideration to establish revised exposure values for the next longer and shorter exposure frames which do not cause the ratio of these exposure values to exceed the prescribed maximum allowed exposure ratio. More particularly, a revised over-exposed pixel count for the shorter exposure frame under consideration is computed by adding one-half the over-exposed pixel count to one-half of the under-exposed pixel count. The intensity histogram generated for the shorter exposure frame is then used to find the intensity value associated with the revised over-exposure pixel count. The exposure value of the shorter exposure frame under consideration is next multiplied by a ratio of the inverse of the camera response function at the intensity value representing a saturated pixel to the inverse of the camera response function at the intensity value associated with the revised over-exposure pixel count to produce the exposure value for the next shorter exposure frame to be captured. Finally, the exposure for the next longer exposure frame to be captured is established by multiplying the exposure computed for the next shorter exposure frame to be captured by the prescribed maximum allowed exposure ratio.

However, if it was found that the ratio of the previously computed tentative exposure values is not greater than or equal to the prescribed maximum allowed exposure ratio, it is instead first determined if the over-exposed pixel count of the shorter exposure frame under consideration is greater than the over-exposed pixel target count. If so, the exposure for the next shorter exposure frame to be captured is set to an exposure value representing a decrease over the exposure value employed for the shorter exposure frame under consideration. This is accomplished by employing a bump procedure, which specifies the percentage the exposure value associated with the shorter exposure frame under consideration is to be decreased to produce the exposure value to be used in capturing the next shorter exposure frame.

It is next determined whether the under-exposed pixel count of the longer exposure frame under consideration is greater than the under-exposed pixel target count. If it is, the exposure for the next longer exposure frame to be captured is set to an exposure value representing an increase over the exposure value employed for the longer exposure frame under consideration. This is accomplished by employing a bump procedure, which this time specifies the percentage the exposure value associated with the longer exposure frame under consideration is to be increased to produce the exposure value to be used in capturing the next longer exposure frame.

These last established exposure values are then used to capture the next shorter and longer exposure frames of the video, unless it is determined that the ratio of these exposure values is greater than or equal to the prescribed maximum allowed exposure ratio. If it is, the exposure value for the next longer exposure frame to be captured and the exposure value for the next shorter exposure frame to be captured are reset by balancing the over-exposed pixel count associated with the shorter exposure frame under consideration with the under-exposure pixel count associated with the longer exposure frame under consideration to establish revised exposure values for the frames to be captured that do not cause the ratio of the exposure values to exceed the prescribed maximum allowed exposure ratio. This is accomplished as described above.

The portion of the HDR video generation system and process involved with identifying corresponding pixels between the frame under consideration and both preceding and subsequent neighboring frames is accomplished as follows. The immediately preceding neighboring frame is uni-directionally warped to produce an approximate registration of the preceding frame with the frame under consideration. Similarly, the immediately subsequent neighboring frame is uni-directionally warped to produce an approximate registration of the subsequent frame with the frame under consideration. In addition, both the preceding and subsequent frames are bi-directionally warped to produce interpolated frames representing approximate registrations of these neighboring frames with the frame under consideration. Warping both uni-directionally and bi-directionally creates redundancy in the registration that is later exploited to increase tolerance to registration errors. It is noted that the method used to accomplish the foregoing warping varies depending on whether the neighboring frames are both shorter exposure frames or longer exposure frames, as well as in some cases whether three consecutive frames have all different exposures or not.

In the case of immediately preceding or subsequent neighboring frames that are both short exposure frames (regardless of whether their exposures match), the uni-directional warping of either involves first boosting the intensity of the neighboring frame to substantially match the intensity range of the longer exposure frame under consideration. The neighboring frame being warped is the registered with the frame under consideration using a standard forward warping technique for the preceding frame and a standard backward warping technique for the subsequent frame. Conversely, if the preceding or subsequent neighboring frames are both long exposure frames (again regardless of whether their exposures match), the uni-directional warping of the preceding frame involves first boosting the intensity of the shorter exposure frame under consideration to substantially match the preceding frame's intensity range, and then registering the preceding frame with the frame under consideration using a standard forward warping technique. Whereas, the uni-directional warping of the subsequent frame involves first boosting the intensity of the shorter exposure frame under consideration to substantially match the subsequent frame's intensity range, and then registering the subsequent frame with the frame under consideration using a standard backward warping technique.

As for the bi-directional warping of the neighboring frames in a case where the frame under consideration is a longer exposure frame and the preceding and subsequent frames are shorter exposure frames having substantially identical exposures, the following procedure is employed. First, a bi-directional flow field is computed for the preceding and subsequent frames, respectively. The preceding frame is then warped using the bi-directional flow field computed for that frame to produce a forward warped frame and the subsequent frame is warped using the bi-directional flow field computed for that frame to produce a backward warped frame. The forward warped frame and the backward warped frame are combined to produce an interpolated frame. Next, the intensity of the interpolated frame is boosted to substantially match the intensity range of the longer exposure frame currently under consideration. A refining flow field that best maps the intensity-boosted interpolated frame to the longer exposure frame under consideration is then established. A refined forward flow field is computed by concatenating the forward flow field with the refining flow field, and a refined backward flow field is computed by concatenating the backward flow field with the refining flow field. The refined forward flow field and refined backward flow field are then applied to the original preceding and subsequent frames, respectively, to produce a refined forward warped frame and refined backward warped frame, respectively.

In the case of bi-directionally warping the neighboring frames where the frame under consideration is a longer exposure frame and the preceding and subsequent frames are shorter exposure frames having substantially different exposures, the procedure starts by determining whether the exposure associated with the preceding frame is shorter or longer than the exposure associated with the subsequent frame. Whenever it is determined that the exposure associated with the preceding frame is shorter, the intensity of the preceding frame is boosted to substantially match the intensity range of the subsequent frame. Whenever it is determined that the exposure associated with the preceding frame is longer than the exposure associated with the subsequent frame, the intensity of the subsequent frame is boosted to substantially match the intensity range of the preceding frame. A bi-directional flow field is then computed for the preceding and subsequent frames, respectively. The preceding frame is warped using the bi-directional flow field computed for that frame to produce a forward warped frame and the subsequent frame is warped using the bi-directional flow field computed for that frame to produce a backward warped frame—noting that it is the intensity boosted version of the preceding or subsequent frame that is warped, as the case may be. The forward warped frame and the backward warped frame are combined to produce an interpolated frame. Next, the intensity of the interpolated frame is boosted to substantially match the intensity range of the longer exposure frame currently under consideration. A refining flow field that best maps the intensity-boosted interpolated frame to the longer exposure frame under consideration is then established. The refined forward flow field is computed by concatenating the forward flow field with the refining flow field, and the refined backward flow field is computed by concatenating the backward flow field with the refining flow field. The refined forward flow field and refined backward flow field are then applied to the original preceding and subsequent frames, respectively, to produce a refined forward warped frame and refined backward warped frame, respectively.

The bi-directional warping of the neighboring frames in a case where the frame under consideration is a shorter exposure frame and the preceding and subsequent frames are longer exposure frames having substantially identical exposures, is accomplished as follows. First, a bi-directional flow field is computed for the preceding and subsequent frames. The preceding frame is then warped using the bi-directional flow field computed for that frame to produce a forward warped frame and the subsequent frame is warped using the bi-directional flow field computed for that frame to produce a backward warped frame. The forward warped frame and the backward warped frame are combined to produce an interpolated frame. Next, the intensity of the frame under consideration is boosted to substantially match the average intensity range of the preceding and subsequent frames. A refining flow field that best maps the interpolated frame to the intensity boosted frame under consideration is then established. The refined forward flow field is computed by concatenating the forward flow field with the refining flow field, and the refined backward flow field is computed by concatenating the backward flow field with the refining flow field. The refined forward flow field and refined backward flow field are then applied to the original preceding and subsequent frames, respectively, to produce a refined forward warped frame and refined backward warped frame, respectively.

Finally, in the case of bi-directionally warping the neighboring frames where the frame under consideration is a shorter exposure frame and the preceding and subsequent frames are longer exposure frames having substantially different exposures, the procedure starts by determining whether the exposure associated with the preceding frame is shorter or longer than the exposure associated with the subsequent frame. Whenever it is determined that the exposure associated with the preceding frame is shorter, the intensity of the preceding frame is boosted to substantially match the intensity range of the subsequent frame. Whenever it is determined that the exposure associated with the preceding frame is longer than the exposure associated with the subsequent frame, the intensity of the subsequent frame is boosted to substantially match the intensity range of the preceding frame. A bi-directional flow field is then computed for the preceding and subsequent frames, respectively. The preceding frame is warped using the bi-directional flow field computed for that frame to produce a forward warped frame and the subsequent frame is warped using the bi-directional flow field computed for that frame to produce a backward warped frame. The forward warped frame and the backward warped frame are combined to produce an interpolated frame. Next, the intensity of the frame under consideration is boosted to substantially match the average intensity range of the preceding and subsequent frames. A refining flow field that best maps the interpolated frame to the intensity boosted frame under consideration is then established. The refined forward flow field is computed by concatenating the forward flow field with the refining flow field, and the refined backward flow field is computed by concatenating the backward flow field with the refining flow field. The refined forward flow field and refined backward flow field are then applied to the original preceding and subsequent frames, respectively, to produce a refined forward warped frame and refined backward warped frame, respectively.

The aforementioned bi-directional flow field is computed for each neighboring frame in the case where the frame under consideration is a longer exposure frame and the neighboring preceding and subsequent frames are shorter exposure frames, as follows. First, the preceding and subsequent frames are globally registered by estimating an affine transform that maps one onto the other. A dense motion field is then computed. This motion field represents a local correction to the global transform and is computed using a gradient based optical flow. More particularly, a variant of the Lucas and Kanade technique [4] is used in a Laplacian pyramid framework where both the preceding and subsequent frames are warped towards time k corresponding to the time index of the frame under consideration and the residual flow vectors are estimated between each pixel of the two warped images at each level of the pyramid. The residual flow vectors computed for each pixel at each level of the pyramid are accumulated to establish the local component of the dense motion field. Once the local components of the dense motion field are computed, a composite vector is established for each pixel location in the bi-directional flow field. This composite vector is the sum of an affine component derived from the affine transform rescaled to warp either from the preceding frame to the forward warped frame in the case of the flow field for the preceding frame and from the subsequent frame to the backward warped frame in the case of the flow field for the subsequent frame, and a local component taken from the dense motion field that forms the local correction for the affine component. A bicubic warping technique is then used to transfer each pixel along the appropriate composite vector to form the aforementioned forward or backward warped frame, as the case may be.

The previously described action of combining the forward warped frame and the backward warped frame to produce the combined interpolated frame can be accomplished by averaging the pixel values from both the forward and backward warped frames for a pixel location of the combined interpolated frame, when both are available. Whenever only one pixel value is available from the forward and backward warped frames for a pixel location of the interpolated frame, the available pixel value is used to establish a pixel value for the combined interpolated frame at that pixel location. In the case where there are no pixel values available from the forward and backward warped frames for a pixel location of the interpolated frame, the pixel value for the combined interpolated frame is established at that pixel location by averaging the two pixel values obtained using a zero motion vector.

The previously described action of computing the refining flow field is accomplished as follows. First, a global homography is computed between the frame under consideration and the intensity-boosted interpolated frame. Then, the frame under consideration is segmented into overlapping quadrants. The overlap is preferably between about 5 to about 20 percent. For each of these quadrants, it is determined whether the intensity variation among the pixels within the quadrant under consideration exceeds a prescribed variation threshold. If so, a counterpart region to the quadrant under consideration is identified in the interpolated frame using the global homography. A local homography between the quadrant under consideration and the identified counterpart region in the interpolated frame is then computed. It is then determined if the per-pixel registration error using the local homography is less than the per-pixel registration error using the global homography for the quadrant under consideration. Whenever it is determined the per-pixel registration error using the local homography is less than the per-pixel registration error using the global homography, the local homography is assigned to the quadrant under consideration. Otherwise, the global homography is assigned to the quadrant under consideration. The portion of the refining flow field associated with the quadrant under consideration is established using this local homography, whenever a local homography has been assigned to that quadrant. In cases where a local homography was not computed because the intensity variation test was not passed or where the global homography is assigned to the quadrant, the portion of the refining flow field associated with that quadrant is established using the global homography. Thus, this procedure can be hierarchical, i.e., it can be recursively applied to each local homography, which is then treated as the global homography at the next higher level. Finally, a feathering (i.e., weighted averaging) technique can be applied to the flow components residing within the overlapping regions of the quadrants to minimize flow discontinuities across the resulting refining flow field.

The feathering technique applied to the flow components residing within the overlapping regions of the quadrants can be any desired. However, in tested versions of the HDR video generating system and process, the feathering involved a linear weighting technique. More particularly, wherever just two quadrants overlap, a one dimensional linear weighting was applied to each pixel location such that the portion of the flow component for that location derived from the homography associated with each of the overlapping quadrants is in proportion to its distance from the boundaries of the overlapping region with the respective overlapping quadrants. The closer the pixel location is to one of said boundaries, the greater the portion of the flow component derived from the homography associated with the quadrant adjacent that boundary. In the case where all four quadrants overlap, a two dimensional linear weighting is applied to each pixel location with the same results. Namely, the portion of the flow component for a location is derived from the homography associated with each of the overlapping quadrants is in proportion to its distance from the boundaries of the overlapping region with the respective overlapping quadrants.

The aforementioned bi-directional flow field is computed in the same way for each neighboring frame in the case where the frame under consideration is a shorter exposure frame and the neighboring preceding and subsequent frames are longer exposure frames. The refining flow field is also computed in a similar manner, except that the global homography is computed between the intensity-boosted version of the frame under consideration and the combined interpolated frame in this latter case. In addition, it is the intensity-boosted version of the frame under consideration that is segmented into overlapping quadrants.

As described above, one part of the HDR video generation system and process involved identifying at least one pixel in the each set of corresponding pixels that represents a trustworthy pixel and employing the pixel color information associated with the one or more identified trustworthy pixels to compute a radiance value for that set of pixels to form a radiance map representing a frame of the HDR video. This can be accomplished as follows. First, the frame under consideration, the uni-directionally warped preceding frame, the uni-directionally warped subsequent frame, the bi-directionally warped preceding frame and the bi-directionally warped subsequent frame are each converted to separate radiance images. Note that the original frames, not intensity boosted frames, are the ones that are warped and used from radiance computation. The intensity boosted frames are used to compute the flow fields only.

The final radiance map is computed using all the radiance images. Each radiance value at a given pixel location in the final radiance map is either taken from the radiance image associated with the frame under consideration or is a weighted combination of two or more radiance values taken from the same pixel location in the aforementioned converted radiance images, depending on which values are deemed to be trustworthy based on the intensity of the pixel at that pixel location in the frame under consideration. More particularly, in the case where the frame under consideration is a longer exposure frame, and the preceding and subsequent frames are shorter exposure frames, the radiance map is produced as follows. Once the aforementioned frames have been converted to radiance images, each pixel in the frame under consideration that has an intensity value exceeding a prescribed maximum intensity threshold is identified, and the average of the radiance values associated with the same location in the bi-directionally warped preceding frame and bi-directionally warped subsequent frame is assigned as the radiance value for the corresponding pixel location in the radiance map. In addition, each pixel in the frame under consideration that has an intensity value less than the prescribed maximum threshold is identified, and for each of these pixel locations, it is determined if the radiance values assigned to the corresponding location in the uni-directionally warped preceding frame and the uni-directionally warped subsequent frame are outside a maximum allowable noise variance of the radiance value assigned to the same location in the frame under consideration. If not, a weighted average of all three radiance values is computed and assigned as the radiance value for that pixel location in the radiance map. However, if it is found that one of the radiance values assigned to a pixel location in the uni-directionally warped preceding frame or the uni-directionally warped subsequent frame is outside the maximum allowable noise variance, but the other is not, a weighted average of radiance values assigned to the pixel location in the frame under consideration and the uni-directionally warped frame whose radiance value did not fall outside the variance is computed. This weighted average is then assigned as the radiance value for that pixel location in the radiance map. Finally, if it is found that the radiance values assigned to a pixel location in the uni-directionally warped preceding frame and the uni-directionally warped subsequent frame are both outside the variance, the radiance value assigned to the pixel location in the frame under consideration is assigned as the radiance value for that pixel location in the radiance map.

In the case where the frame under consideration is a shorter exposure frame, and the preceding and subsequent frames are longer exposure frames, the radiance map is produces as follows. Once the aforementioned frames have been converted to radiance images, each pixel in the frame under consideration that has an intensity value exceeding a prescribed minimum intensity threshold is identified. For each of these pixel locations, it is determined if the radiance values assigned to the corresponding location in the uni-directionally warped preceding frame and the uni-directionally warped subsequent frame are outside a maximum allowable noise variance of the radiance value assigned to the same location in the frame under consideration. If not, a weighted average of all three radiance values is computed, and assigned as the radiance value for that pixel location in the radiance map. If, however, it is found that one of the radiance values assigned to a pixel location in the uni-directionally warped preceding frame or the uni-directionally warped subsequent frame is not outside the variance, but the other is not, a weighted average of radiance values assigned to the pixel location in the frame under consideration and the uni-directionally warped frame whose radiance value did not fall outside the variance is computed. This weighted average is then assigned as the radiance value for the corresponding pixel location in the radiance map. Finally, if it is found that the radiance values assigned to a pixel location in the uni-directionally warped preceding frame and the uni-directionally warped subsequent frame are both outside the variance, the radiance value assigned to the pixel location in the frame under consideration is assigned as the radiance value for that pixel location in the radiance map. Lastly, each pixel in the frame under consideration that has an intensity value below the prescribed minimum intensity threshold is identified, and for the corresponding pixel location in the radiance map, the average of the radiance values associated with the same location in the bi-directionally warped preceding frame and bi-directionally warped subsequent frame is assigned as the radiance value.

The HDR video generation system and process can also involve tonemapping of the radiance map to convert it into an 8-bit representation of the HDR frame that is suitable for rendering and display. In general, this entails first converting the radiance map to CIE space and recovering the chromaticity coordinates to produce a luminance image. Next, the dynamic range of the luminance image is compressed and the chrominance re-inserted. The CIE space image is then converted to produce the final 8-bit range RGB image. However, apply this procedure on a frame by frame basis is not sufficient as this can lead to visible temporal inconsistencies in the mapping. In order to compensate for this, the present tonemapping procedure uses statistics from neighboring frames in order to produce tonemapped images that vary smoothly in time. More particularly, this tonemapping procedure departs from the norm in that the dynamic range compression involves computing the average and maximum luminances using information from both the frame under consideration and at least one previous frame.

It is noted that the previously-described hierarchical global registration process has application outside just the generation of HDR video frames. In general, this procedure can be employed to establish a flow field that maps any one image of a scene to another image of the scene. The procedure is essentially the same as described above when limited to just two hierarchical levels. However, if more than two levels are prescribed, an expanded procedure is employed. Namely, the hierarchical global registration process for establishing a flow field that maps one image of a scene to another image of a scene in the case where two or more levels are prescribed is accomplished as follows. First, a global homography is computed between the images. One of the images is then segmented into overlapping quadrants. For each of these quadrants, it is determined whether the intensity variation among the pixels within the quadrant under consideration exceeds a prescribed variation threshold. If so, a counterpart region to the quadrant under consideration is identified in the non-segmented image using the global homography. Next, a local homography is computed between the quadrant under consideration and the identified counterpart region in the non-segmented image. It is then determined if the per-pixel registration error using the local homography is less than the per-pixel registration error using the global homography for the quadrant under consideration. Whenever it is determined the per-pixel registration error using the local homography is less than the per-pixel registration error using the global homography, the local homography is assigned to the quadrant under consideration. Otherwise, the global homography is assigned to the quadrant under consideration.

Then, for each prescribed hierarchical level above two, each of the quadrants associated with the previous level, which passed the intensity variation test, are segmented into overlapping quadrants representing the quadrants of the current hierarchical level. For each quadrant in the current level, it is determined whether the intensity variation among the pixels within the quadrant under consideration exceeds the prescribed variation threshold. If so, a counterpart region to the quadrant under consideration is identified in the non-segmented image using the homography assigned to the quadrant in the previous level from which the quadrant under consideration in the current level was segmented. A local homography is then computed between the quadrant under consideration and the identified counterpart region in the non-segmented image. It is then determined if the per-pixel registration error using the local homography computed between the quadrant under consideration and the identified counterpart region in the non-segmented image is less than the per-pixel registration error using the homography assigned to the quadrant in the previous level from which the quadrant under consideration in the current level was segmented. Whenever it is determined the per-pixel registration error using the local homography computed between the quadrant under consideration and the identified counterpart region in the non-segmented image is less, assigning the local homography to the quadrant under consideration. Otherwise, the homography assigned to the quadrant in the previous level, from which the quadrant under consideration in the current level was segmented, is assigned to the quadrant under consideration.

For each quadrant in each hierarchical level not itself further segmented into quadrants, a portion of the flow field associated with the quadrant under consideration is computed using the homography computed for and assigned to that quadrant. Otherwise, the portion of the flow field associated with the quadrant under consideration is computed using the homography assigned to the quadrant in the previous level, from which the quadrant under consideration in the current level was segmented. Finally, a feathering technique can be applied to the flow components residing within the overlapping regions of the quadrants to minimize flow discontinuities across the resulting flow field.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 15 is a diagram illustrating the hierarchical homography process used in the bidirectional warping procedure of FIGS. 8, 9, 12 and 14 A-B in simplified form where just two levels and one quadrant are considered.

FIGS. 18(a)-(b) are graphs associated with the radiance map computation procedure of FIG. 2, where the graph of FIG. 18(a) plots global weight vs. intensity, and the graph of FIG. 18(b) plots the modulation function based on radiance consistency of matched pixels.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The HDR Video Generating System Computing Environment

Figure 1:
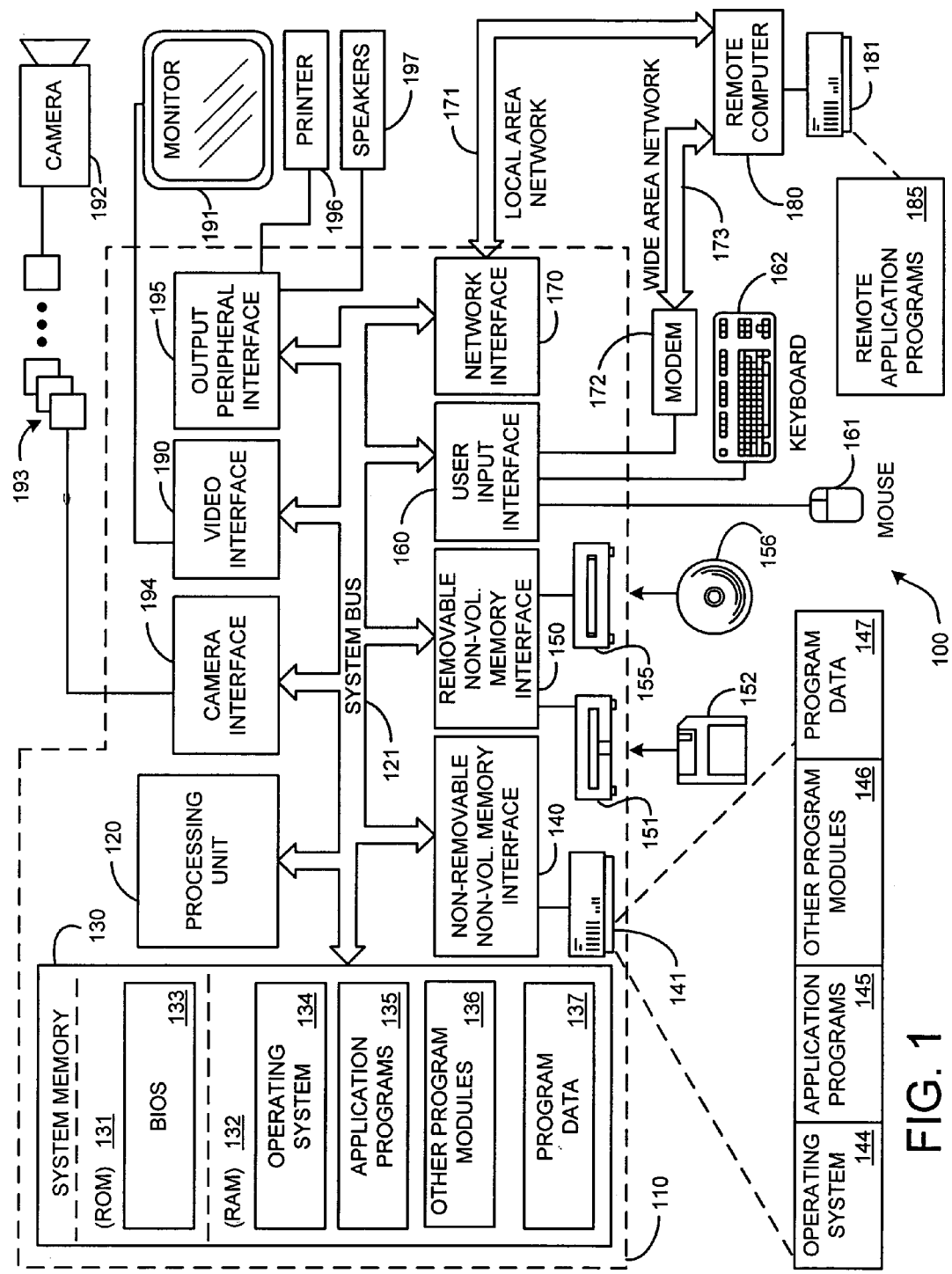
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
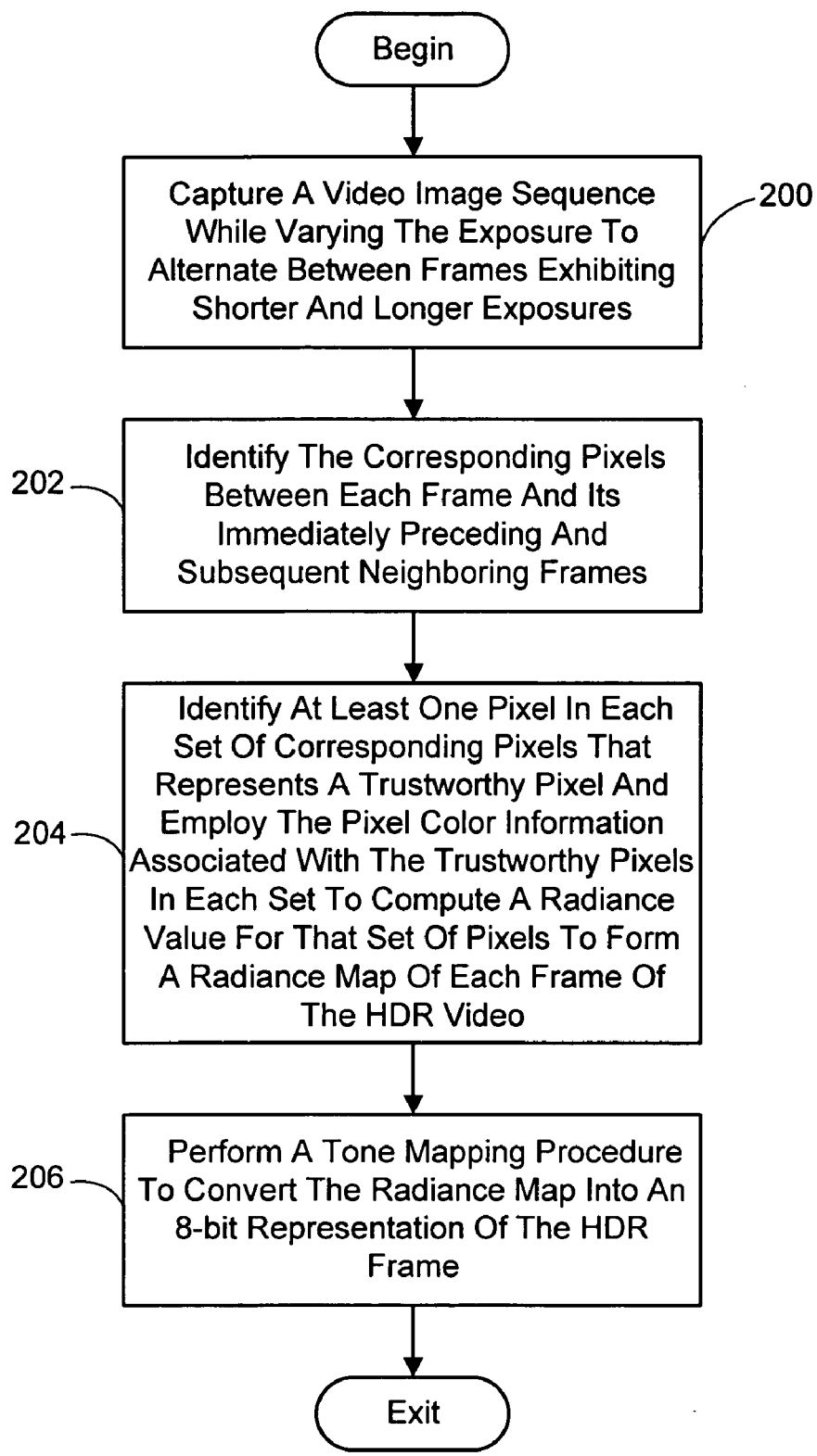
FIG. 2 is a flow chart diagramming an overall process for generating HDR video.

The exemplary operating environment having now been discussed, the remaining part of this description section will be devoted to a description of the program modules embodying the invention. Generally, the system and process according to the present invention involves generating a High Dynamic Range (HDR) video from a video image sequence captured while varying the exposure of each frame. In general, this is accomplished via the following process actions, as shown in the high-level flow diagram of FIG. 2:

a) capturing a video image sequence while varying the exposure of each frame so as to alternate between frames exhibiting a shorter exposure and a longer exposure as a function of the pixel brightness distribution in preceding frames of the video (process action 200);

b) for each frame of the video after a prescribed number of initiating frames, identifying the corresponding pixels between the frame under consideration and both preceding and subsequent neighboring frames (process action 202);

c) for each of the corresponding pixels sets, identifying at least one pixel in the set that represents a trustworthy pixel and then employing the pixel color information associated with the trustworthy pixels in each set to compute a radiance value for that set of pixels, thus forming a radiance map representing a frame of the HDR video (process action 204); and, d) performing a tone mapping procedure to convert the radiance map into an 8-bit representation of the HDR frame that is suitable for rendering and display (process action 206).

2.0 Real Time Exposure Control

The auto gain control (AGC) of a typical video camera measures the brightness of the scene and computes an appropriate exposure. Most scenes have a greater dynamic range than can be captured by the camera's 8 bit per pixel sensor. Because of this, regardless of the exposure settings, some pixels will be saturated and some will be under exposed. In order to capture a greater dynamic range, the present HDR video system varies exposure settings on a per frame basis. The general idea is to sequence the settings between different values that appropriately expose dark and bright regions of the scene in turn. A post processing step, which will be described later, then combines these differently exposed frames.

Many still picture cameras today allow for auto bracketing. When auto bracketing a scene, the camera determines the correct exposure via the current metering mode, and then additionally captures the scene at shorter and longer exposures. The present HDR video system modifies this approach in that instead of bracketing with a fixed multiple of the middle exposure, a set of exposures more appropriate for the scene is automatically determined.

Figure 3:
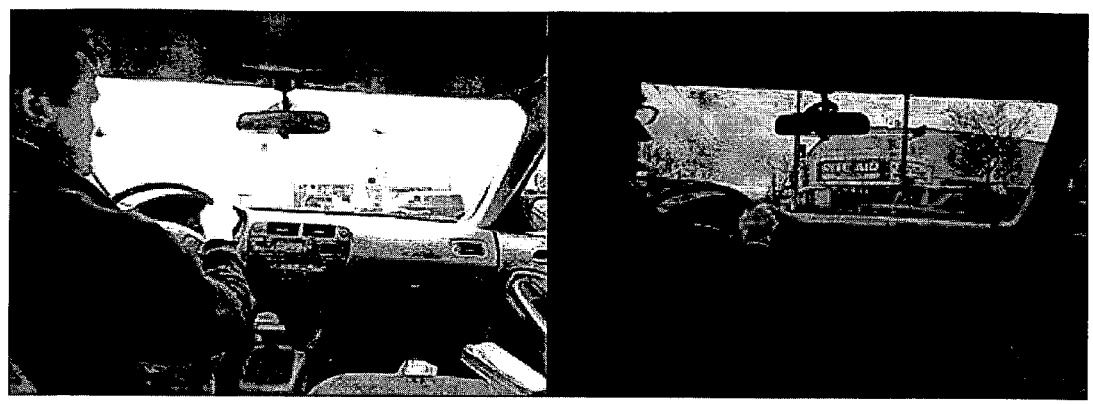
FIG. 3 is a pair of successive frames of a driving video captured in accordance with the video image sequence capture portion of the process of FIG. 2, where the first frame is a longer exposure frame and the second frame is a shorter exposure frame.
Figure 4:
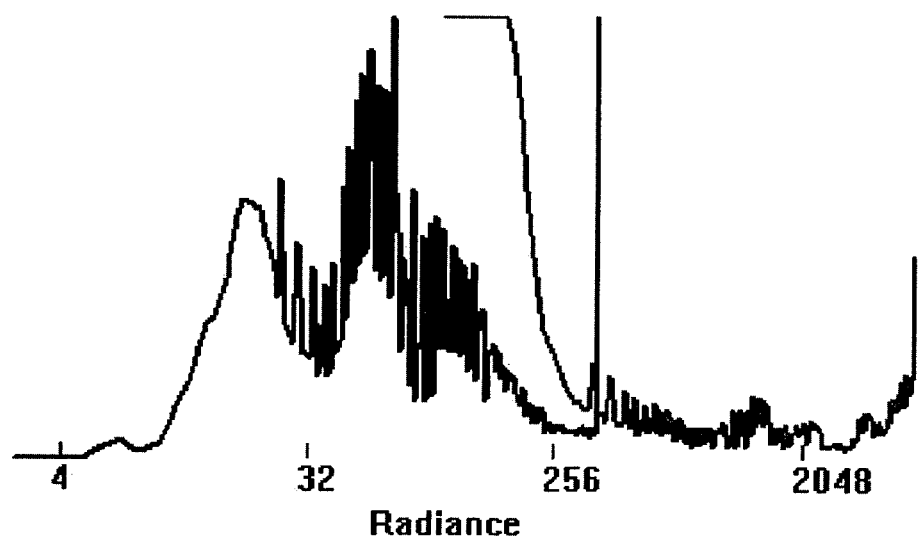
FIG. 4 is a combined intensity histogram of the two images shown in FIG. 3 in radiance space. The left hand side of the plot corresponds to the long exposure frame, while the right hand side of the plot corresponds to the short exposure frame.

For example, in a tested embodiment a conventional digital video camera having a programmable control unit was employed. The firmware of this camera was updated with a bank of four shutter (CCD integration time) and gain (ADC gain) registers. During normal operation, the camera does a round robin through the bank using a different register set at every frame time. Additionally, the camera tags every frame with the current settings so that they can be used during the radiance map computation. In tested embodiment of this capture phase, all the current setting of the camera were tagged as metadata to each frame being captured. A real time AGC algorithm determines the next group of four settings. The exposure settings alternate between two different values. More particularly, the appropriate exposures are automatically determined from scene statistics, which are computed on a sub-sampled frame. All portions of the frame are weighted equally because in generating HDR imagery the goal is normally to provide tonal detail everywhere. The two exposures are continuously updated to reflect scene changes. An example of a pair of successive frames captured by the camera is shown in FIG. 3, and a corresponding histogram in radiance space is shown in FIG. 4. The left hand plot in FIG. 4 corresponds to a long exposure frame shown in the left hand side of FIG. 3, while the right hand side plot in FIG. 4 corresponds to a short exposure frame shown in the right hand side of FIG. 3. It is clear from FIGS. 3 and 4 that a single exposure is not sufficient to capture the radiance range of this scene. However, notice that a combination of these two plots spans a radiance range greater than any one exposure can capture. This observation is used advantageously in the present system, as will now be explained.

The present HDR video system is designed so that the exposure ratio between long and short exposures is minimized while simultaneously allowing a larger range of scene radiances to be accommodated. This increases the number of pixels that are useful for matching in both frames.

Figure 5A:
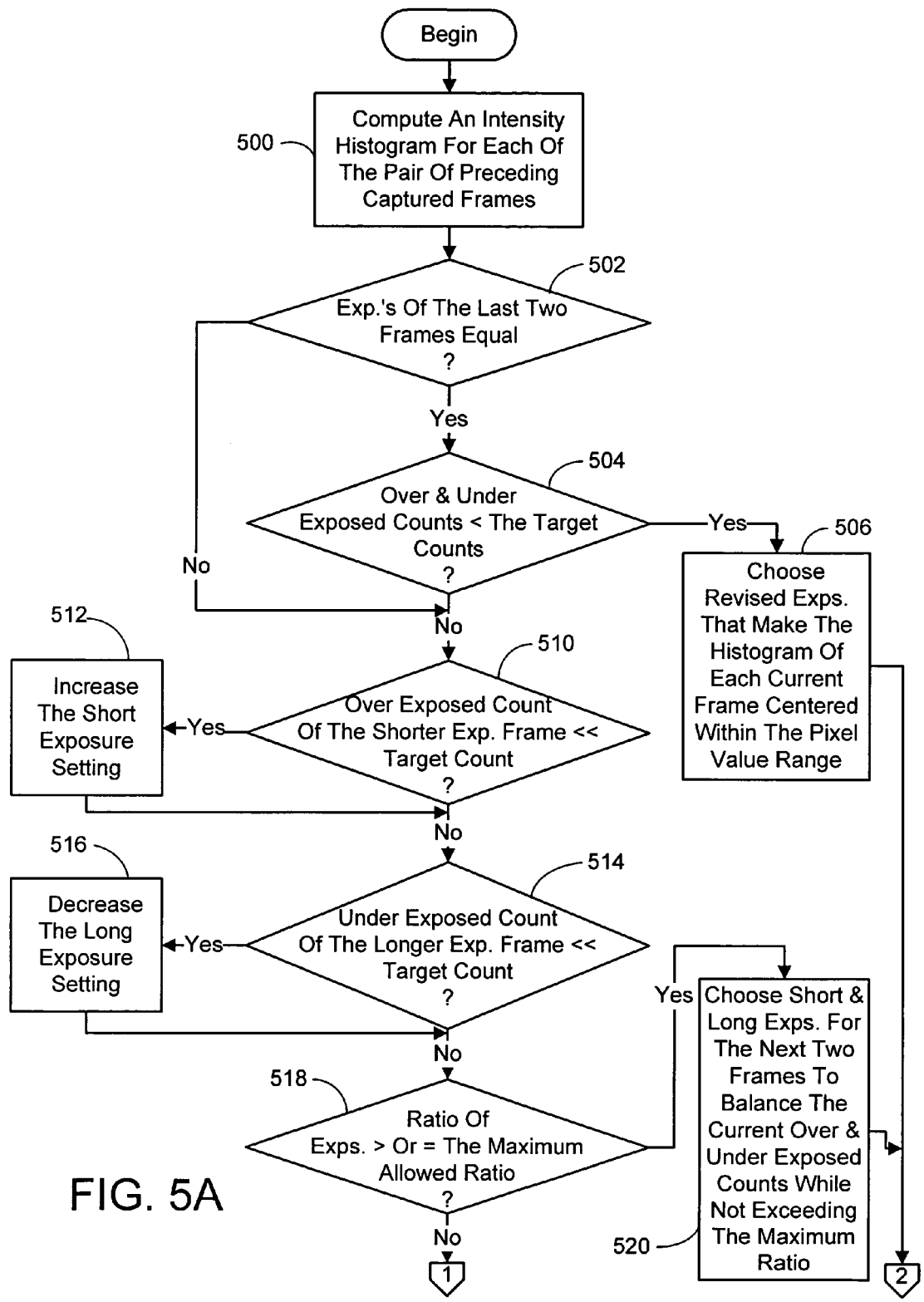
FIGS. 5A-B are a flow chart diagramming one embodiment of the video image sequence capture portion of the process of FIG. 2.
Figure 5B:
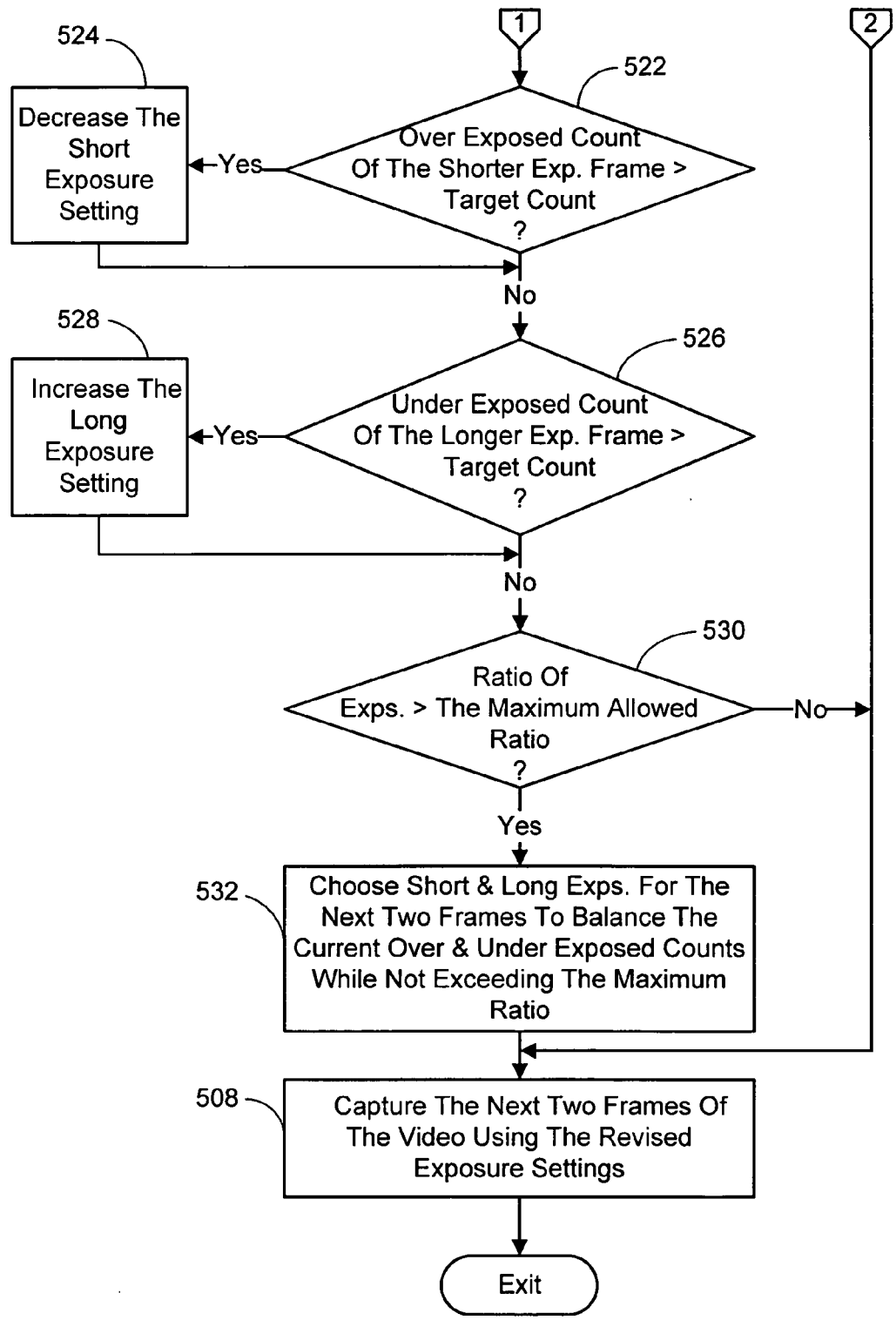

Referring to FIGS. 5A-B, the first step in calculating exposure settings to be used in capturing subsequent frames is to compute an intensity histogram for each of a pair of immediately preceding, already captured frames (process action 500). The system uses these histograms along with several programmable constraints to compute the subsequent exposure setting for the same number of frames. These constraints are the maximum exposure ratio, the over exposed (saturated) target pixel count, and the under exposed (black) target pixel count. In tested embodiments of the present HDR video generation process, the maximum exposure ratio was set to 16, the over exposed target pixel count was set to 1 percent of the total number of pixels, and the under exposed target pixel count was also set to 1 percent of the total number of pixels. However, it is not intended that the present invention be limited to the values used in the tested embodiments. For example, the maximum exposure ratio could be set within a range from about 1 to about 32. Similarly, the over exposed target pixel count could be set within a range of about 1 to 5 percent, where the target count would be higher when the scene depicted in the frames under consideration is relatively dark. The under exposed target pixel count can also be set within a range of about 1 to 5 percent. In this latter case the target count would be set higher when the scene depicted in the frames under consideration is relatively bright.

It is noted that the aforementioned pair of previously captured frames analyzed to compute the exposure settings for a like number of subsequent frames yet to be captured requires that a few frames be captured to initialize the process (i.e., at least two). These initial frames can be captured using the normal exposure setting feature of the camera (which will choose a "middle" exposure setting), or a prescribed set of exposure values could bootstrap the system.

In the following description of the auto gain process, the prescribed number of frames analyzed will be assumed to be two. This is a good choice for typical applications. However, if it is known that the scene being captured will exhibit very large brightness ranges, such as a dark indoor scene looking out on a bright day, using just two exposures may not be adequate. Increasing the exposure gap between successive frames will capture the dynamic range better, but will make the image registration procedure that will be discussed later more brittle and will lead to increased image noise in the mid tones. Using more than two exposures is another option, but similar exposures (where registration has the best chance of success) are then temporally farther apart, again leading to potential registration and interpolation problems. Thus, unless a very large brightness range is anticipated, analyzing two exposures is preferred to prevent the aforementioned problems.

Referring again to FIGS. 5A-B, the process continues in process action 502 by determining if the exposure settings associated with the last two frames captured are equal (e.g., the ratio of the long exposure setting value/short exposure setting value is 1). If they are equal, then it is also determined, for the shorter exposure frame, if its over exposed pixel count (e.g., the number of pixels with an intensity value equal to 255 in a typical 8-bit representation of intensity, which are often referred to as saturated pixels) is less than the aforementioned over exposed pixel cont target, and the under exposed pixel count of the lower exposure frame (e.g., the number of pixels with an intensity value equal to about 16 or less in a typical 8-bit representation of intensity, which are often referred to as black pixels), is less than the aforementioned under exposed pixel target count (process action 504). If so, a new exposure setting is chosen for the next pair of shorter and longer exposure frames to be captured, such that the histogram associated with the appropriate frame under consideration is centered within the range of pixel values (process action 506). This is accomplished using the following equation:

$$\exp_1 = \frac{F_{response}^{-1}(128)}{F_{response}^{-1}(x)} \exp_0, \quad (1)$$

where $F_{response}$ is the response function of the camera used to capture the frames, $F_{response}(128)$ represents the response of the camera at a center of the range of pixel values (assuming an 8-bit representation of 0-255 brightness levels), $F_{response}(x)$ represents the response of the camera at the brightness level "x" (which in this case corresponds to level where the aforementioned brightness histogram is currently centered), $\exp_0$ is the exposure level associated with the frame under consideration, and $\exp_1$ is the new exposure level. The revised exposure settings are then applied to capture the next two frames of the video (process action 508). It is noted that while any appropriate technique can be employed, in tested embodiments of the present HDR video generation system $F_{response}$ was computed using the technique of [6]

If, however, the foregoing conditions of either process action 502 or 504 are not met, then in process action 510 it is determined for the frame having the shorter exposure setting if the over exposed count is much less than its target count (e.g., about 0.25 percent of the total number of pixels in the frame if the over exposed target count is set at about 1 percent). If not, then the short exposure setting value (i.e., the exposure time assigned for the short exposure frame of the pair of frames under consideration) is not changed. However, if the over exposed count is found to be much less than its target count, then the short exposure setting value is increased (process action 512). This is accomplished by computing the new short exposure setting using the following equation:

$$\exp_{1short} = \frac{F_{response}^{-1}(255)}{F_{response}^{-1}(x_{99\%})} \exp_{0short}, \quad (2)$$

where $F_{response}(255)$ represents the response of the camera at the brightness saturation level (assuming an 8-bit representation of 0-255 brightness levels), $F_{response}(x_{99\%})$ represents the response of the camera at the brightness level "$x_{99\%}$" (which is the highest level obtained among the first 99 percent of the pixels when ordered by brightness level starting with the smallest value), $\exp_{0short}$ is the exposure level associated with frame having the shorter exposure value, and $\exp_{1short}$ is the new shorter exposure level. One easy way to determine the $x_{99\%}$ value is to compute a cumulative histogram for the shorter exposure frame.

Whether or not the short exposure setting is changed, it is next determined in process action 514 whether the under exposed count of the longer exposure frame is much less than its target (e.g., only about 0.25 of the total number of pixels in the frame if the under exposed target count is set at about 1 percent). If not, then the long exposure setting value (i.e., the exposure time assigned for the long exposure frame of the pair of frames under consideration) is not changed. If, however, it is determined that the under exposed count is much less than its target, then the long exposure setting value is decreased (process action 516). This is accomplished by computing the new long exposure setting using the following equation:

$$\exp_{1long} = \frac{F_{response}^{-1}(BlkValue)}{F_{response}^{-1}(x_{1\%})} \exp_{0long}, \quad (3)$$

where $F_{response}(BlkValue)$ represents the response of the camera at the brightness level associated with a black pixel (which is typically about 16 or less in an 8-bit representation of brightness levels), $F_{response}(x_{1\%})$ represents the response of the camera at the brightness level "$x_{1\%}$" (which is the highest level obtained among the first 1 percent of the pixels when ordered by brightness level starting with the smallest value), $\exp_{0long}$ is the exposure level associated with frame having the longer exposure value, and $\exp_{1long}$ is the new longer exposure level. An easy way to determine the $x_{1\%}$ value is to compute a cumulative histogram for the longer exposure frame.

Whether or not the long exposure setting is changed, it is next determined in process action 518 if the ratio of the exposure settings, changed or otherwise, for the long and short exposure frames (e.g., long exposure setting value/short exposure setting value) is greater than or equal to the aforementioned prescribed maximum allowed ratio (R). If so, the short and long exposure settings respectively assigned to the next two frames to be captured are chosen such that the over exposed and under exposed pixel counts of the shorter and longer exposure frames under consideration are balanced, while not going above the maximum ratio (process action 520). This balancing is accomplished as follows. Essentially, a new over exposed pixel count ($Sat_{new}$) is computed first, from the histogram associated with the frame captured at the shorter exposure setting of the pair of frames under consideration, using the equation:

$$Sat_{new}=Sat_{old}+(Blk_{old}-Sat_{old})/2=Sat_{old}/2+Blk_{old}/2, \quad (4)$$

where $Sat_{old}$ is the over exposed pixel count of the shorter exposure frame and $Blk_{old}$ is the under exposed pixel count of the longer exposure frame. The new over exposed count ($Sat_{new}$) is then used to determine a brightness value ($x_{Satnew}$) by finding $Sat_{new}$ on the aforementioned cumulative histogram associated with the shorter exposure frame and reading the corresponding brightness level. The new exposure level for the short exposure frame that is about to be captured is then computed using the following equation:

$$\exp_{1short} = \frac{F_{response}^{-1}(255)}{F_{response}^{-1}(x_{Satnew})}\exp_{0short}, \quad (5)$$

Once the new exposure level for the shorter exposure frame is computed, a new exposure level for the longer exposure frame about to be captured is established as:

$$\exp_{1long}=\exp_{1short}\times R \quad (6)$$

If, however, it is determined in process action 518 that the ratio of the exposure settings for the long and short exposure frames does not equal or exceed the prescribed maximum (R), then a different procedure is employed. Namely, it is first determined whether the over exposed count of the shorter exposure frame is greater than the over exposed target count (process action 522). If so, the short exposure setting value is decreased (process action 524). In this case, a prescribed decrease "bump" schedule is employed. This involves decreasing the short exposure setting by a first prescribed amount (e.g., 10% in tested embodiments of the procedure) if this value was not decreased in connection with the processing of the shorter exposure frame immediately preceding the pair currently under consideration. In other words, if this short exposure value decreasing procedure was not employed when processing the aforementioned previous frame, then the first prescribed decrease amount is applied to the short exposure setting. If, however, a decrease was applied to the aforementioned preceding short exposure frame, then a different decrease amount is applied. The updated decrease amount is computed as follows. If the over exposed count did not change or increased relative to the previous frame then the decrease amount is doubled relative to the previous amount (e.g., 10%, 20%, 40%, . . . to a maximum of 100% in the tested embodiment). If the over exposed count did however decrease but hasn't yet reached the target count then the short exposure setting is again decreased by the most recently used decrease amount. Finally if the target count has been reached the "bump" schedule is terminated. It is noted that in order to implement the foregoing decrease procedure, each consecutive decrease event must be noted and stored for use in determining the decrease amount in a subsequent iteration of the procedure.

Once the short exposure setting has been decreased, or if it was determined that the over exposed count did not exceed the target count, it is next determined if the under exposed count of the longer exposure frame exceeds its target count (process action 526). If so, then the long exposure setting value is increased (process action 528). A similar procedure is employed in that a prescribed increase "bump" schedule is employed. This involves increasing the long exposure setting by a first prescribed amount (e.g., 10% in tested embodiments of the procedure) if this value was not increased in connection with the processing of the longer exposure frame immediately preceding the pair currently under consideration. If, however, an increase was applied to the aforementioned preceding long exposure frame, then a different increase amount is applied. The updated increase amount is computed as follows. If the under exposed count did not change or increased relative to the previous frame then the increase amount is doubled relative to the previous amount (e.g., 10%, 20%, 40%, . . . to a maximum of 100% in the tested embodiment). If the under exposed count did however increase but hasn't yet reached the target count then the long exposure setting is again increased by the most recently used increase amount. Finally if the target count has been reached the "bump" schedule is terminated. Accordingly, here too, for the foregoing increase procedure, each consecutive increase event must be noted and stored for use in determining the increase amount in a subsequent iteration of the procedure.

Once the long exposure setting has been increased, or if it was determined that the under exposed count did not exceed the target count, it is next determined in process action 530 if the aforementioned ratio of exposure settings equals or exceeds the prescribed maximum ratio (R). If so, the short and long exposure settings respectively assigned to the next two frames to be captured are chosen to balance these two counts while not going above the maximum ratio using the balancing procedure described above (process action 532). The revised exposure settings are then applied to capture the next two frames of the video (process action 508). If, however, it is determined that the ratio of the exposure settings for the long and short exposure frames do not equal or exceed the prescribed maximum (R), the exposure settings are not changed any further and these unchanged settings are used to capture the next pair of frames of the video (process action 508).

The foregoing process is repeated for each pair of frames captured in the video. Thus, as indicated above, the frames of the video will alternate between a short exposure frame and a long exposure frame throughout. The final HDR video is generated from this precursor video using the temporally varying exposure frames, as will be described in the next section.

3.0 HDR Stitching

Since the frames of the above-described precursor video are captured with temporally varying exposures, generating an HDR frame at any given time requires the transfer of pixel color information from neighboring frames. This, in turn, requires that the pixel correspondences across different frames be highly accurate. The process of computing the pixel correspondences, transferring color information from neighboring frames and extracting the HDR image is referred to as HDR stitching.

The precursor video contains alternating long and short exposure frames. The first step in HDR stitching is to generate a set of long and short exposure frames at every instant so that a radiance map can be computed from this set. This is preferably accomplished by synthesizing the missing exposures using a warping process.

More particularly, the HDR stitching process generates four warped frames. In the case where the frame under consideration is a long exposure frame, the four warped frames are a bi-directionally warped (interpolated) short exposure frames from the left and right neighbors ($S'_{k*}{}^F$ and $S'_{k*}{}^B$), a uni-directionally warped short exposure left frame ($S_{k*}{}^{F0}$), and a uni-directionally warped short exposure right frame ($S_{k*}{}^{B0}$). In the case where the current frame under consideration is a short exposure frame, the four warped frames are a bi-directionally warped (interpolated) long exposure frames from the left and right neighbors ($L'_{k*}{}^F$ and $L'_{k*}{}^B$), a uni-directionally warped long exposure left frame ($L_{k*}{}^{F0}$), and a uni-directionally warped long exposure right frame ($L_{k*}{}^{B0}$). The redundancy represented by these warped frames is later exploited to increase tolerance to registration errors. In the foregoing frame nomenclature S refers to a short exposure frame, L refers to a long exposure frame, F refers to a forward warped frame, B refers to a backward warped frame and k refers to the time index of the frame.

First assume that the current frame of the precursor video under consideration was captured at a long exposure $L_k$ with adjacent frames captured at short exposures ($S_{k-1}$ and $S_{k+1}$). Referring to the process flow diagram of FIG. 6, in an initial phase of the HDR stitching process, these preceding and subsequent frames are registered with the current frame using conventional forward and backward matching and warping methods (process action 602). However, this is done only after boosting the intensity of the preceding and subsequent frames to substantially match the intensity range of the long exposure frame (process action 600). The warped preceding and subsequent frames are the aforementioned $S^{k*F0}$ and $S_{k*}{}^{B0}$ frames, respectively. It is noted that the short exposure frames are boosted in intensity to match the long exposure frame to facilitate the registration process. In boosting an image, each pixel intensity or color is multiplied by a factor greater than 1. It is preferable to boost the short exposure frames rather than downscale the long exposure frame to prevent mismatch in pixel intensities in the saturated regions of the long exposure frame. The short exposure frames are boosted to match loss of detail in the saturated regions in the long exposure frames. It is also noted that boosted images are only used to compute the flow field, as will be explained. They are not used to compute the radiance map due to the noise introduced in the boosting process.

Figure 6:
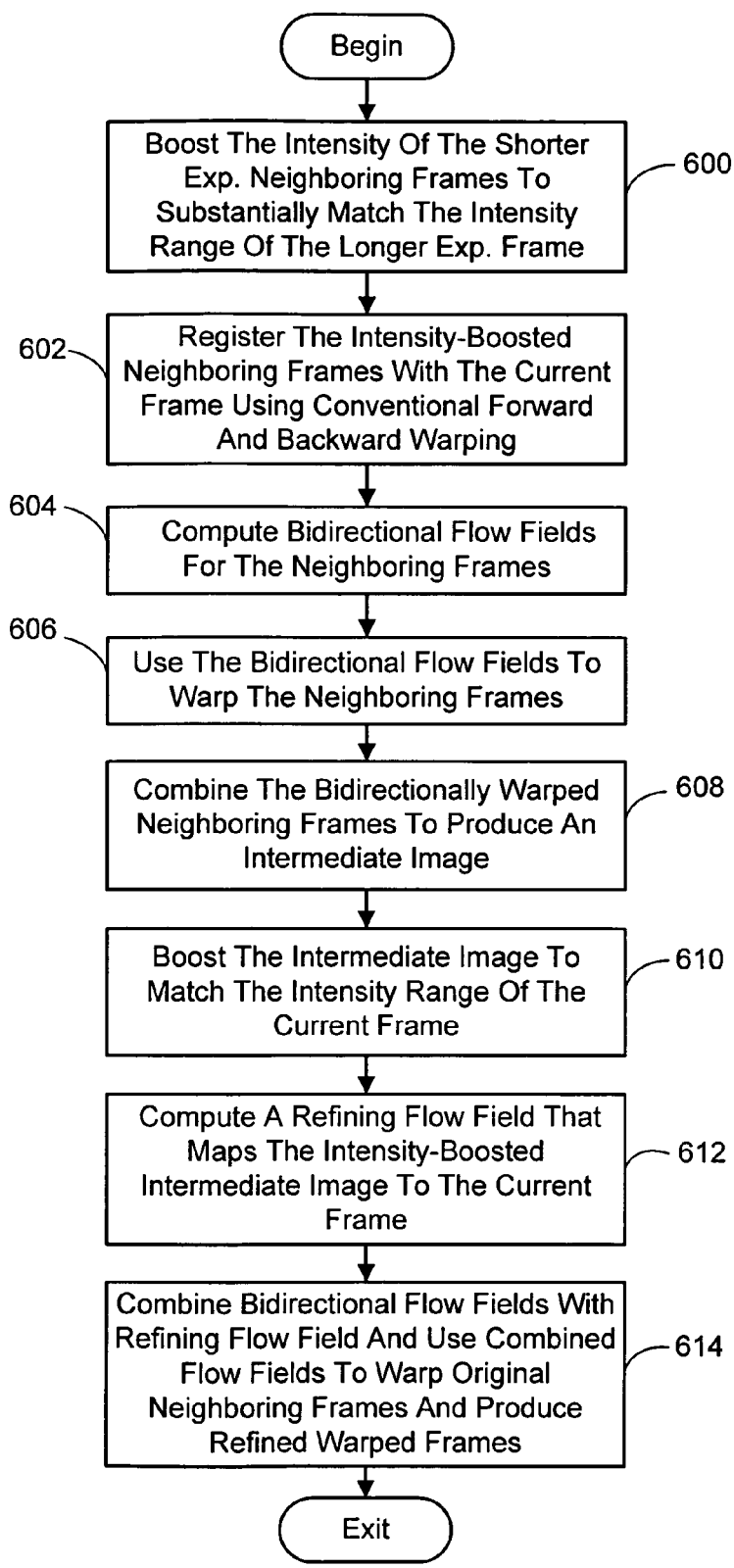
FIG. 6 is a flow chart diagramming one embodiment of the HDR stitching portion of the process of FIG. 2, where a long exposure frame is considered, and adjacent preceding and subsequent short exposure frames having substantially identical exposures are registered with it in various ways.
Figure 7:
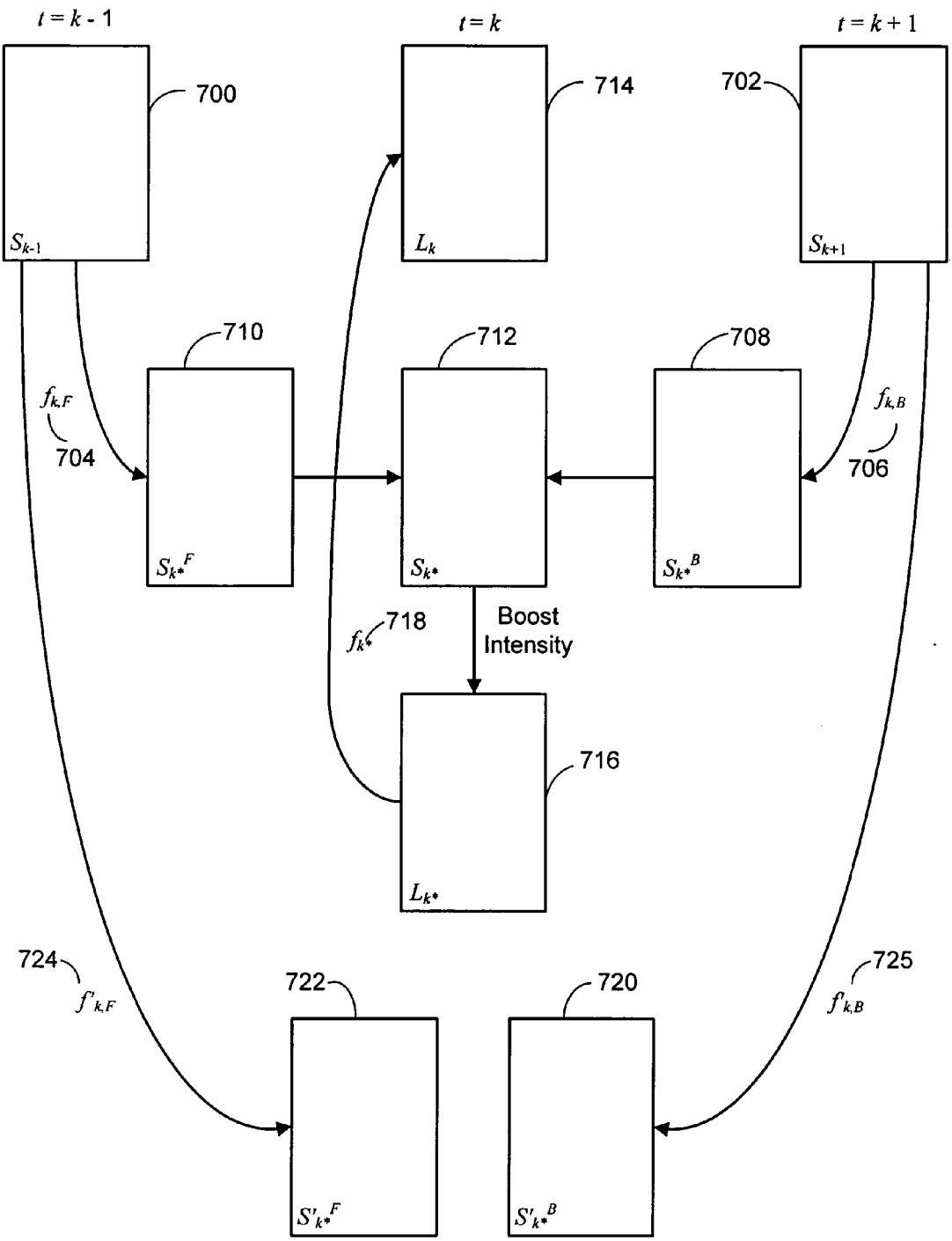
FIG. 7 is a block diagram illustrating the bidirectional warping portion of the HDR stitching process of FIG. 6.

In a second phase of the HDR stitching process, the aforementioned bidirectionally-warped frames $S'_{k*}{}^F$ and $S'^{k*B}$ are computed using all three input frames from the precursor video, as illustrated diagrammatically in FIG. 7 and process-wise in FIG. 6. For the case where adjacent exposures (associated with $S_{k-1}$ (700) and $S_{k+1}$ (702) in this case) are identical, the HDR stitching process begins as follows.

1. Using frames $S_{k-1}$ and $S_{k+1}$, the bidirectional flow fields (forward warp $f_{k,F}$ (704) for $S_{k-1}$ (700) and backward warp $f_{k,B}$ (706) for $S_{k+1}$ (702)) are computed using a gradient based technique which will be described shortly (process action 604). These flow fields are then used to warp the respective images to produce two images-namely $S_{k*}{}^B$ (708) and $S_{k*}{}^F$ (710) in process action 606. These images are combined in process action 608 to produce an intermediate image (i.e., the aforementioned bidirectionally-warped interpolated frame $S_{k*}$ (712)). This intermediate image should be close in appearance to $L_k$ (714).
2. The individual pixel intensities of $S_{k*}$ (712) are next boosted to match the corresponding pixels of $L_k$ (714) in process action 610 to produce the image $L_{k*}$ (716).
3. A hierarchical global registration technique (which will also be described shortly) is employed in process action 612 to compute a refining flow $f_{k*}$ (718) that best maps $L_{k*}$ (716) to $L_k$ (714). The refining flow $f_{k*}$ (718) is then used in process action 614 to combine with $f_{k,F}$ (704) and $f_{k,B}$ (706) to produce composite flows $f'_{k,F}=f_{k*}*f_{k,F}$ (724) and $f'_{k,B}=f_{k*}*f_{k,B}$ (725), which are then used to warp $S_{k-1}$ (700) to produce $S'_{k*}{}^F$ (722), and warp $S_{k+1}$ (702) to produce $S'_{k*}{}^B$ (720), respectively.

The images $L_k$, $S_{k*}{}^{F0}$, $S'_{k*hu\ B0}$, $S'_{k*}{}^B$, and $S'_{k*}{}^F$ are used together to compute an HDR image at time k as will be explained shortly.

For the case where the preceding and subsequent exposures are different from one another, a modified procedure is employed to compute $S'_{k*}{}^B$, and $S'_{k*}{}^F$. In this modified procedure the intensity of the preceding or subsequent frame that has the lower exposure is boosted to match the other side image before $S_{k*}$ is computed. Thus, $S_{k*}$ will be computed using $S_{k-1}$ and $S_{k+1Boost}$ if $\exp S_{k-1} > \exp S_{k+1}$, or $S_{k+1}$ and $S_{k-1Boost}$ if $\exp S_{k-1} 21 \exp S_{k+1}$. Once $f_{kF}$, $f_{kB}$, and $f_{k*}$ have been computed, $S_{k-1}$ is warped to produce $S'_{k*}{}^F$ using $f'_{k,F}=f_{k*}*f_{k,F}$ and $S_{k+1}$ is warped to produce $S'_{k*}{}^B$ using $f'_{k,B}=f_{k*}*f_{k,B}$. Thus, $S'_{k*}{}^B$, and $S'_{k*}{}^F$ will have different exposures associated with them.

Accordingly, referring to the diagram of FIG. 8 and the process flow chart of FIGS. 9A-B, for the case where the current frame of the precursor video under consideration was captured at a long exposure $L_k$ with adjacent frames captured at short exposures ($S_{k-1}$ (800) and $S_{k+1}$ (802)), and where the preceding and subsequent exposures are different from one another, the HDR stitching process begins as follows.

1. In the initial phase of the process, the preceding and subsequent frames are boosted in intensity to match the current frame that has a longer exposure (process action 900). These frames are then registered with the current frame using conventional forward and backward warping methods (process action 902). The warped preceding and subsequent frames are the aforementioned $S^{k*F0}$ and $S_{k*}{}^{B0}$ frames, respectively.
2. Next it is determined whether $\exp S_{k-1} > \exp S_{k+1}$ or $\exp S_{k-1} < \exp S_{k+1}$ (process action 904). If it is determined that $\exp S_{k-1} < \exp S_{k+1}$, then in process action 906 $S_{k-1}$ (800) is boosted to match the intensity range of $S_{k+1}$ (802), thereby producing $S_{k-1Boost}$ (804). If, however, it is found that $\exp S_{k-1} > \exp S_{k+1}$, then in process action 908 $S_{k+1}$ (802) is boosted to match the intensity range of $S_{k-1}$ (800), thereby producing $S_{k+1Boost}$ (806).

Figure 8:
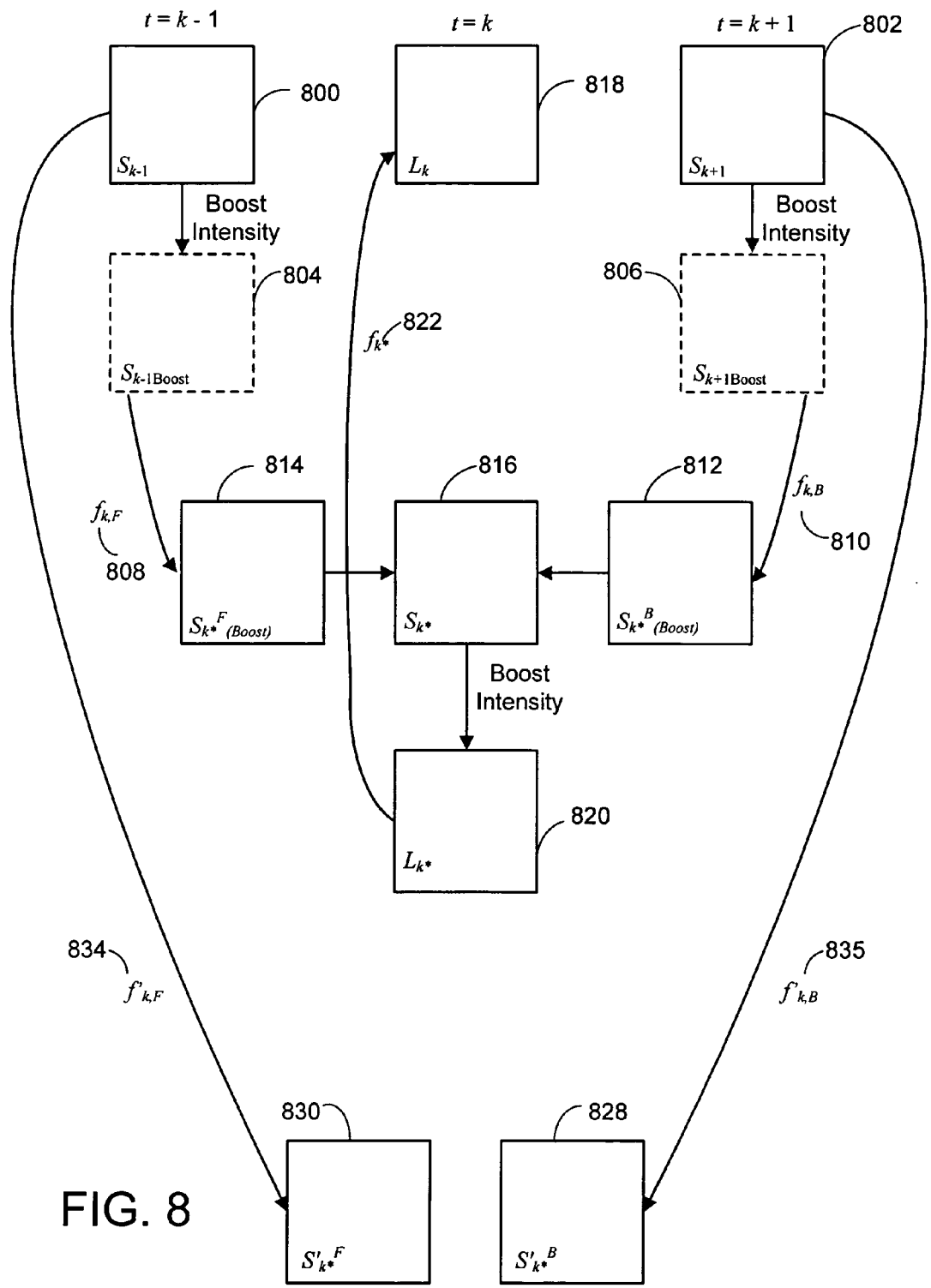
FIG. 8 is a block diagram illustrating the bidirectional warping portion of the HDR stitching process of FIG. 2, where a long exposure frame is considered and the adjacent preceding and subsequent short exposure frames have substantially different exposures.
Figure 9A:
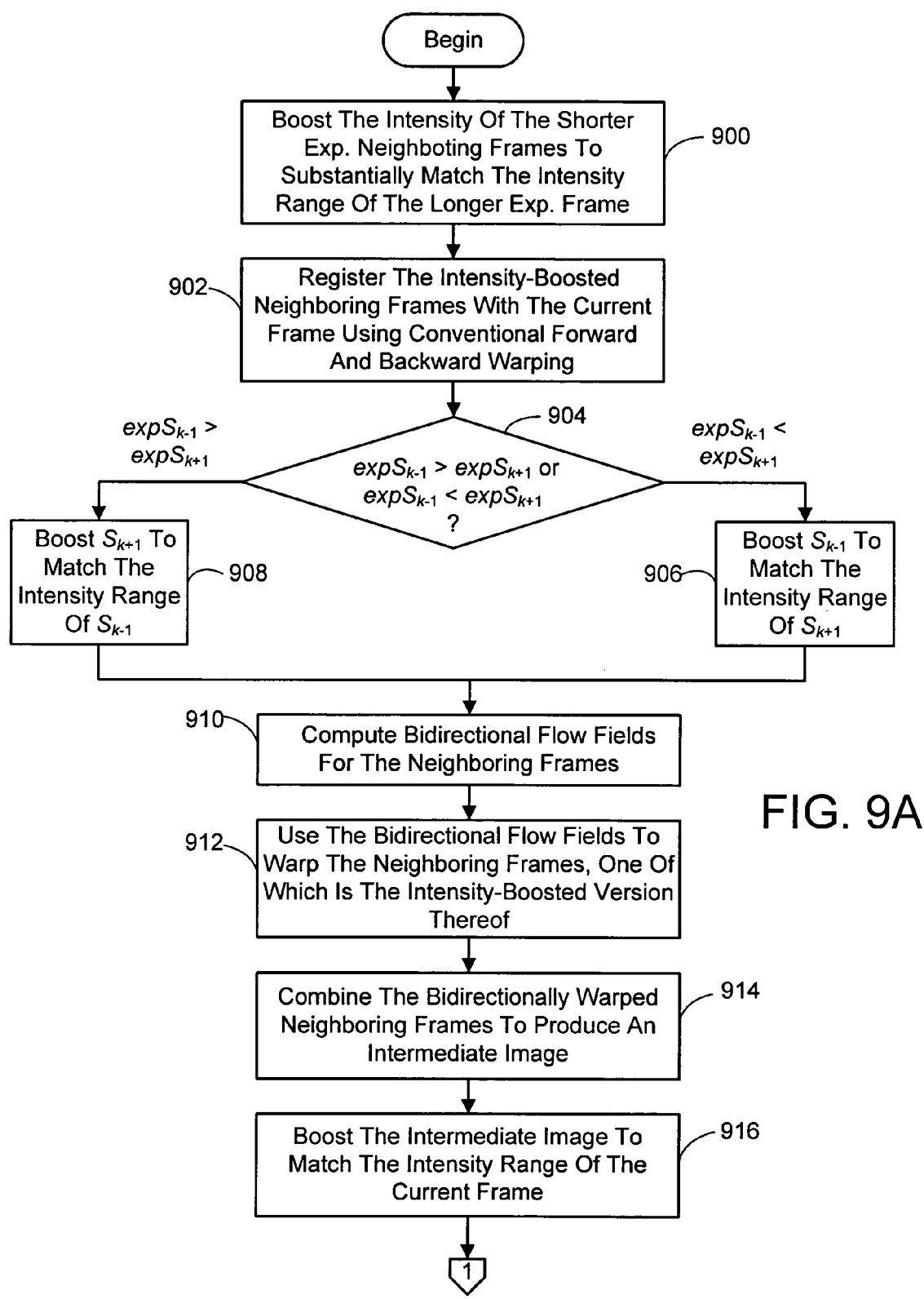
FIGS. 9A-B are a flow chart diagramming one embodiment of the HDR stitching portion of the process of FIG. 2, where a long exposure frame is considered, and adjacent preceding and subsequent short exposure frames having substantially different exposures are registered with it in various ways.
Figure 9B:
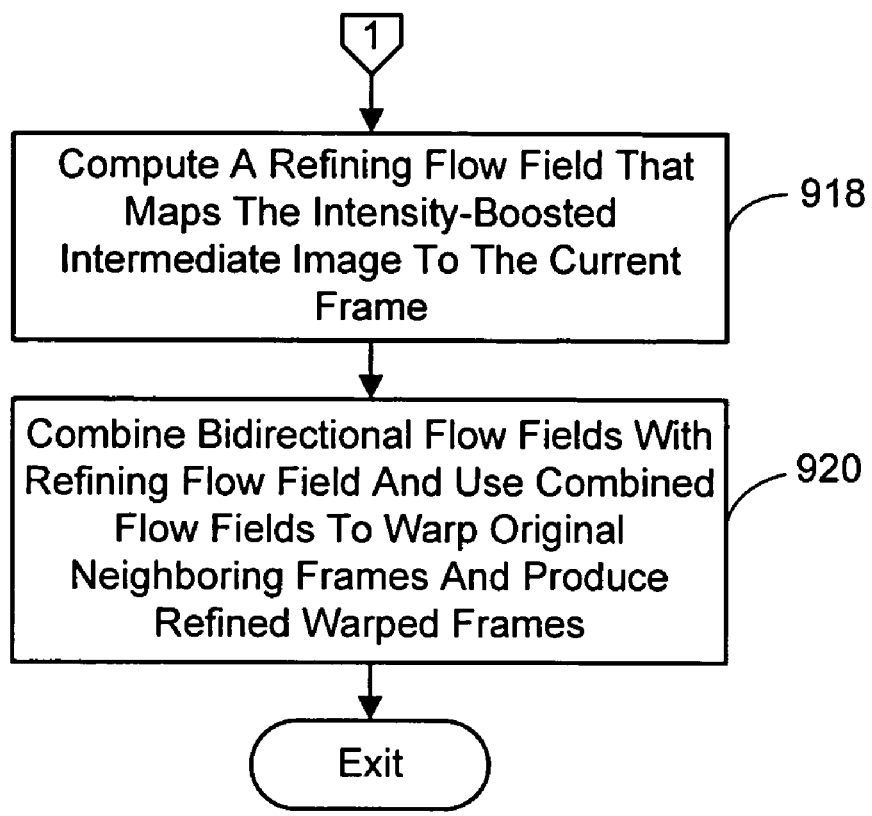

It is noted that the alternate nature of the foregoing boosting procedure is represented in FIG. 8 by using broken line boxes.

3. The bidirectional flow fields (forward warp $f_{k,F}$ (808) for $S_{k-1}$ (800) and backward warp $f_{k,B}$ (810) for $S_{k+1}$ (802)) are computed using the aforementioned gradient based technique (process action 910). These flow fields are then used to warp the respective images to produce two images-namely $S_{k*(Boost)}^{B}$ (812) and $S_{k*(Boost)}^{F}$ (814) (where the (Boost) subscript designator indicates the image may be based on an intensity boosted frame or not) in process action 912, one of which will be based on a boosted version of the original frame from the precursor video. These images are combined in process action 914 to produce an intermediate image (i.e., the aforementioned bidirectionally-warped frame $S_{k*}$ (816)). This intermediate image should be close in appearance to $L_k$ (818).

4. The individual pixel intensities of $S_{k*}$ (816) are next boosted to match the corresponding pixels of $L_k$ (818) in process action 916 to produce the image $L_{k*}$ (820).

5. The aforementioned hierarchical global registration technique is employed in process action 918 to compute the refining flow $f_{k*}$ (822) that best maps $L_{k*}$ (820) to $L_k$ (818).

6. The refining flow $f_{k*}$ (822) is combined with $f_{k,F}$ (808) and $f_{k,B}$ (810) to produce composite flows $f'_{k,F}=f_{k*}*f_{k,F}$ (834) and $f'_{k,B}=f_{k*}*f_{k,B}$ (835), which are then used to warp $S_{k-1}$ (800) to produce $S'_{k*}^{F}$ (830), and warp $S_{k+1}$ (802) to produce $S'_{k*}^{B}$ (828) respectively (process action 920).

As before, the images $L_k$, $S_{k*}^{F0}$, $S_{k*}^{B0}$, $S'_{k*}^{B}$, and $S'_{k*}^{F}$ are used together to compute an HDR image at time k.

Figure 10:
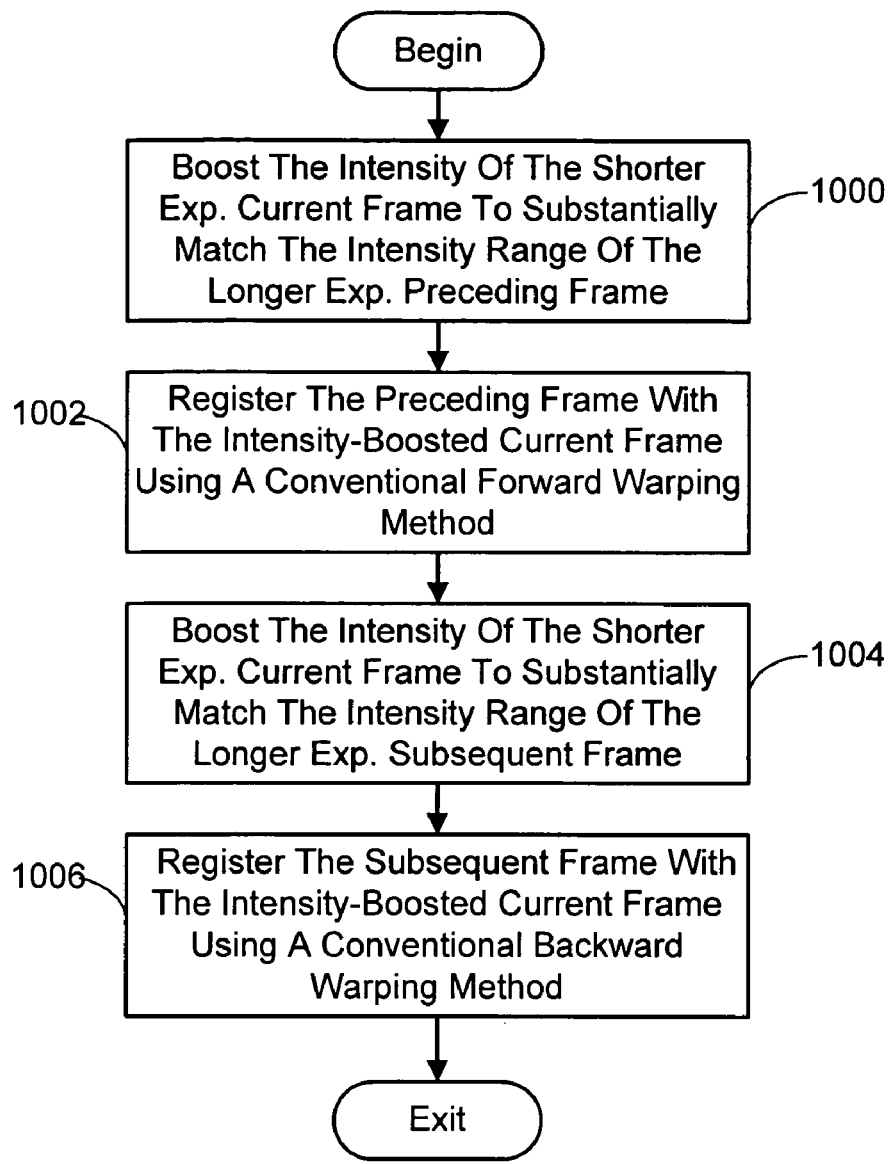
FIG. 10 is a flow chart diagramming one embodiment of the initial phase of the HDR stitching portion of the process of FIG. 2 involving uni-directional warping, where a shorter exposure frame is considered with adjacent preceding and subsequent longer exposure frames.

The procedure is similar for the reverse condition where the frame of the precursor video under consideration was captured at a short exposure $S_k$ and the adjacent frames were captured at long exposures ($L_{k-1}$, and $L_{k+1}$). Referring now to the process flow chart of FIG. 10, in the initial phase of the HDR stitching process these preceding and subsequent frames are registered with the current frame using conventional forward and backward warping methods. The resulting warped preceding and subsequent frames are the aforementioned $L_{k*}^{F0}$ and $L_{k*}^{B0}$ frames, respectively. More particularly, $S_k$ is first boosted to match the intensity range of $L_{k-1}$ (process action 1000) prior to forward warping to produce $L_{k*}^{F0}$ (process action 1002), and $S_k$ is boosted to match the intensity range of $L_{k+1}$ (process action 1004) prior to backward warping to produce $L_{k*}^{B0}$ (process action 1006).

Figure 11:
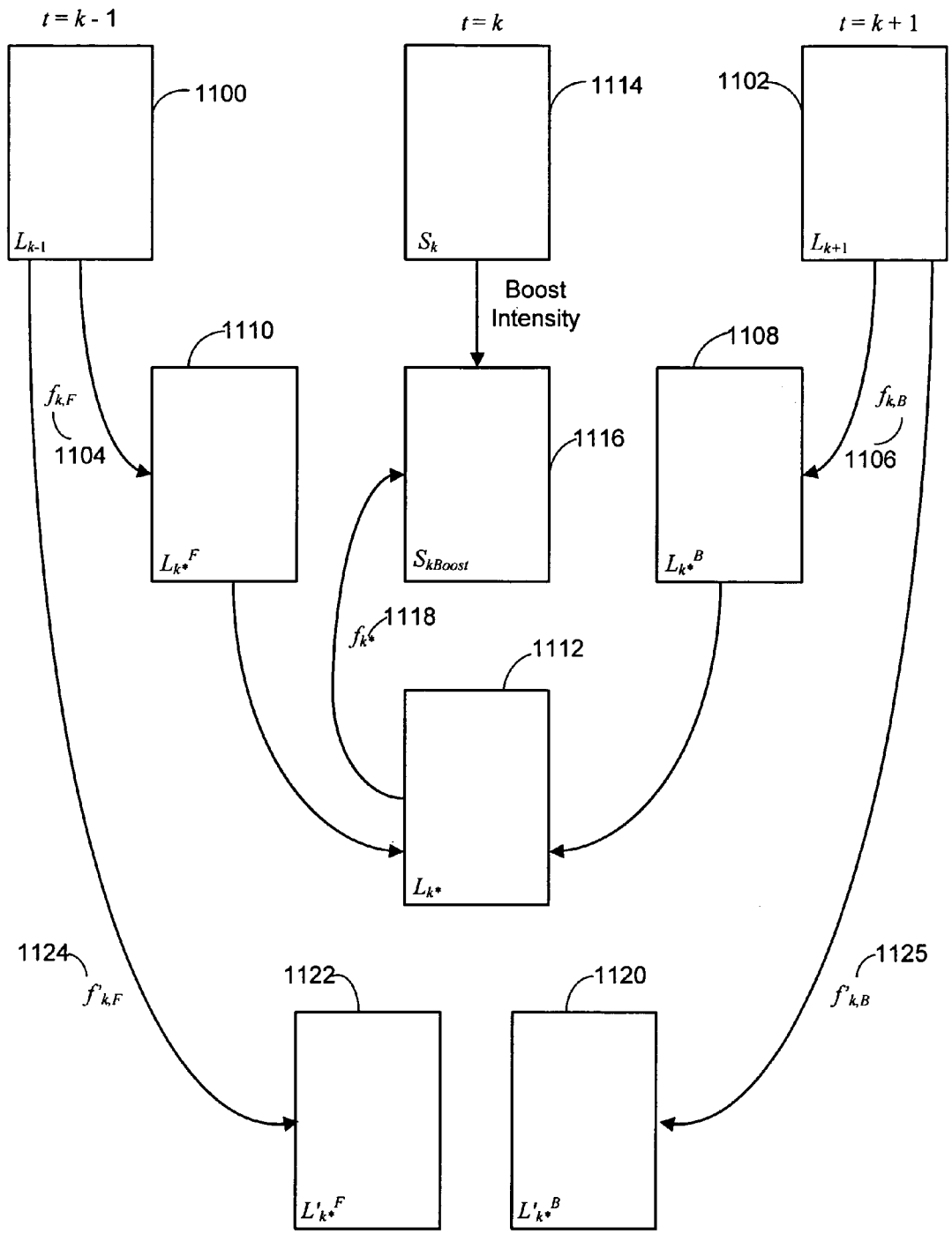
FIG. 11 is a block diagram illustrating the bidirectional warping portion of the HDR stitching process of FIG. 2, where a shorter exposure frame is considered and the adjacent preceding and subsequent longer exposure frames have substantially identical exposures.
Figure 12:
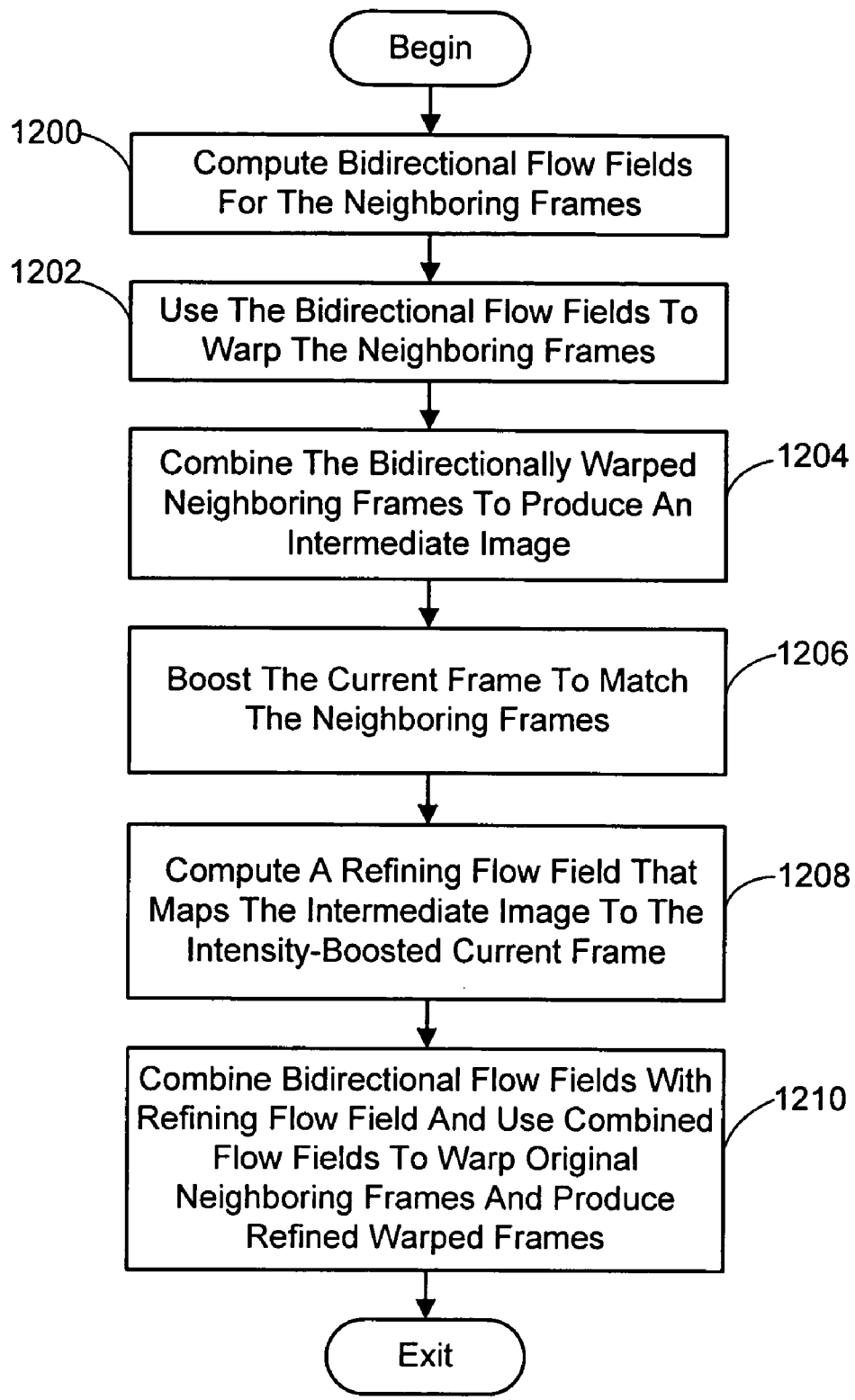
FIG. 12 is a flow chart diagramming one embodiment of the bidirectional warping portion of the HDR stitching of the process of FIG. 2, where a shorter exposure frame is considered, and adjacent preceding and subsequent longer exposure frames having substantially identical exposures are registered with it.

In the second phase of the process, the aforementioned bidirectionally-warped frame $L_{k*}$ is computed using all three input frames from the precursor video, as illustrated diagramically in FIG. 11 and process-wise in FIG. 12, for the case where adjacent exposures (associated with $L_{k-1}$ (1100) and $L_{k+1}$ (1102) in this case) are identical. More particularly, the HDR stitching process begins as follows.

1. The bidirectional flow fields (forward warp $f_{k,F}$ (1104) for $L_{k-1}$ (1100) and backward warp $f_{k,B}$ (1106) for $L_{k+1}$ (1102)) are computed using the aforementioned gradient based technique (process action 1200). These flow fields are then used to warp the respective images to produce two images-namely $L_{k*}^{B}$ (1108) and $L_{k*}^{F}$ (1110) in process action 1202. The images are combined in process action 1204 to produce an intermediate image (i.e., the aforementioned bidirectionally-warped frame $L_{k*}$ (1112)). This intermediate image should be close in appearance to the aforementioned intensity-boosted version of $S_k$ (1114).

2. The individual pixel intensities of $S_k$ (1114) are next boosted to match the those of $L_{k-1}$ (1100) and $L_{k+1}$ (1102) in process action 1206. This operation produces the image $S_{k_{Boost}}$ (1116).

3. The aforementioned hierarchical global registration technique is employed in process action 1208 to compute the refining flow $f_{k*}$ (1118) that best maps $L_{k*}$ (1112) to $S_{k_{Boost}}$ (1116). The refining flow $f_{k*}$ (1118) is combined with $f_{k,F}$ (1104) and $f_{k,B}$ (1106) to produce composite flows $f'_{k,F}=f_{k*}*f_{k,F}$ (1124) and $f'_{k,B}=f_{k*}*f_{k,B}$ (1125), which are then used to warp $L_{k-1}$ (1100) to produce $L'_{k*}^{F}$ (1122), and warp $L_{k+1}$ (1102) to produce $L'_{k*}^{B}$ (1120) respectively.

The images $S_k$, $L_{k*}^{F0}$, $L_{k*}^{B0}$, $L'_{k*}^{B}$, and $L'_{k*}^{F}$ are used together to compute an HDR image at time k as will be explained shortly.

For the case where the preceding and subsequent exposures are different from one another, a modified procedure is employed to compute $L'_{k*}^{B}$, and $L'_{k*}^{F}$. In this modified procedure the intensity of the preceding or subsequent frame that has the lower exposure is boosted to match the other side image before $L_{k*}$ is computed. Thus, $L_{k*}$ will be computed using $L_{k-1}$ and $L_{k+1Boost}$ if $expL_{k-1}>expL_{k+1}$, or $L_{k+1}$ and $L_{k-1Boost}$ if $expL_{k-1}<expL_{k+1}$. Once $f_{kF}$, $f_{kB}$, and $f_{k*}$ have been computed, $L_{k-1}$ is warped to produce $L'_{k*}^{F}$ using $f'_{k,F}=f_{k*}*f_{k,F}$ and $L_{k+1}$ is warped to produce $L'_{k*}^{B}$ using $f'_{k,B}=f_{k*}*f_{k,B}$. Thus, $L'_{k*}^{B}$, and $L'_{k*}^{F}$ will have different exposures associated with them.

Figure 13:
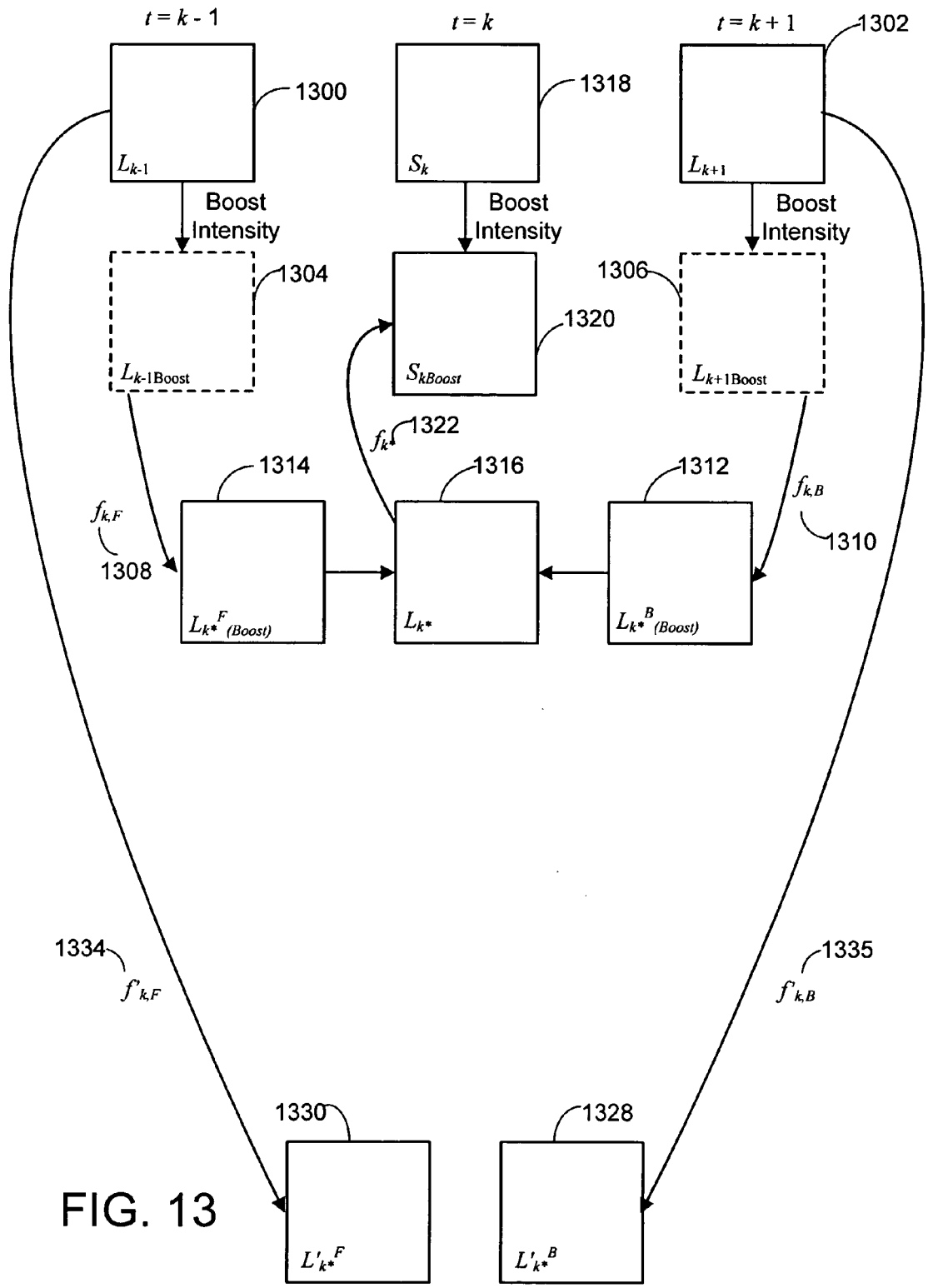
FIG. 13 is a block diagram illustrating the bidirectional warping portion of the HDR stitching process of FIG. 2, where a shorter exposure frame is considered and the adjacent preceding and subsequent longer exposure frames have substantially different exposures.
Figure 14A:
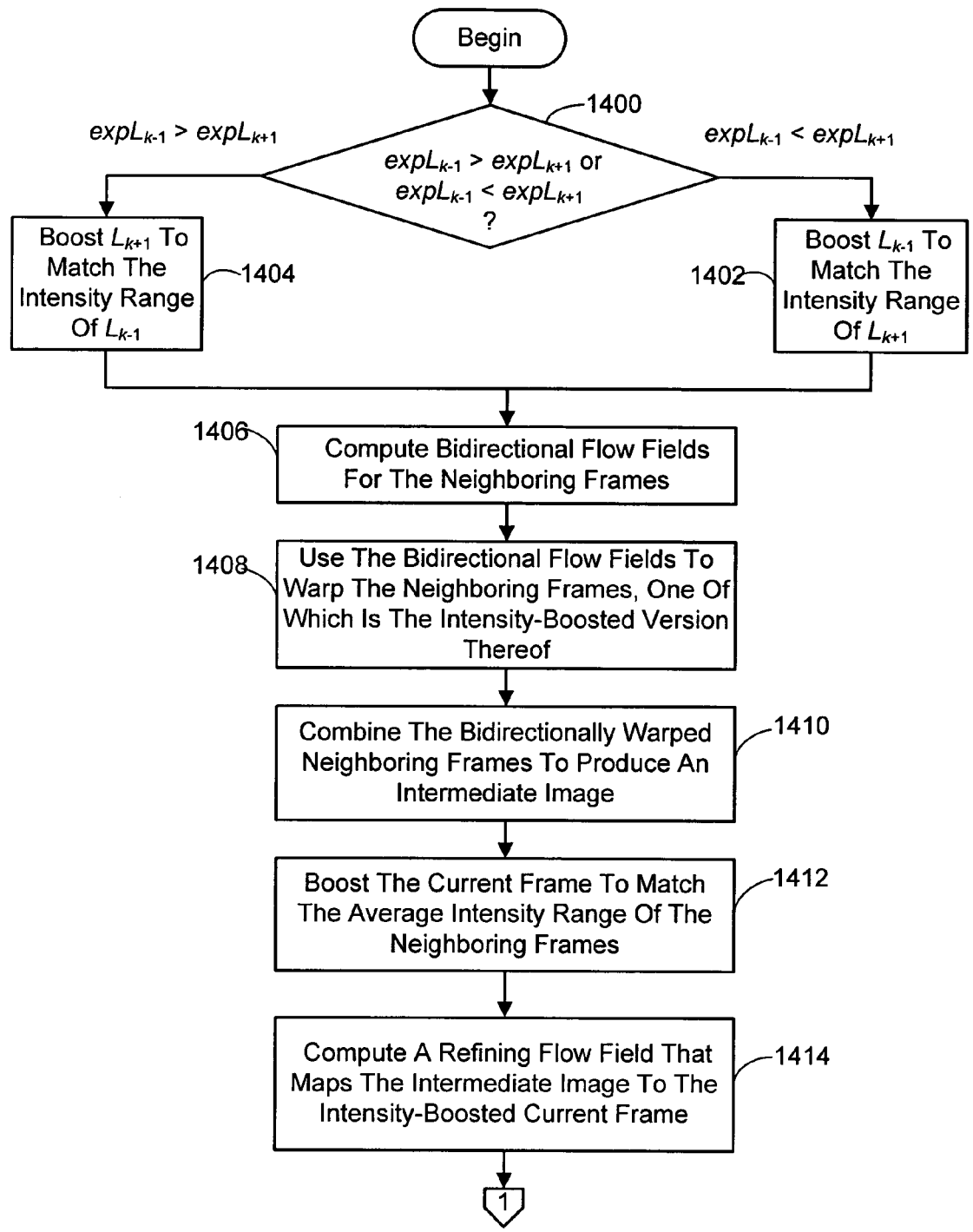
FIGS. 14A-B are a flow chart diagramming one embodiment of the bidirectional warping portion of the HDR stitching of the process of FIG. 2, where a shorter exposure frame is considered, and adjacent preceding and subsequent longer exposure frames having substantially different exposures are registered with it.
Figure 14B:
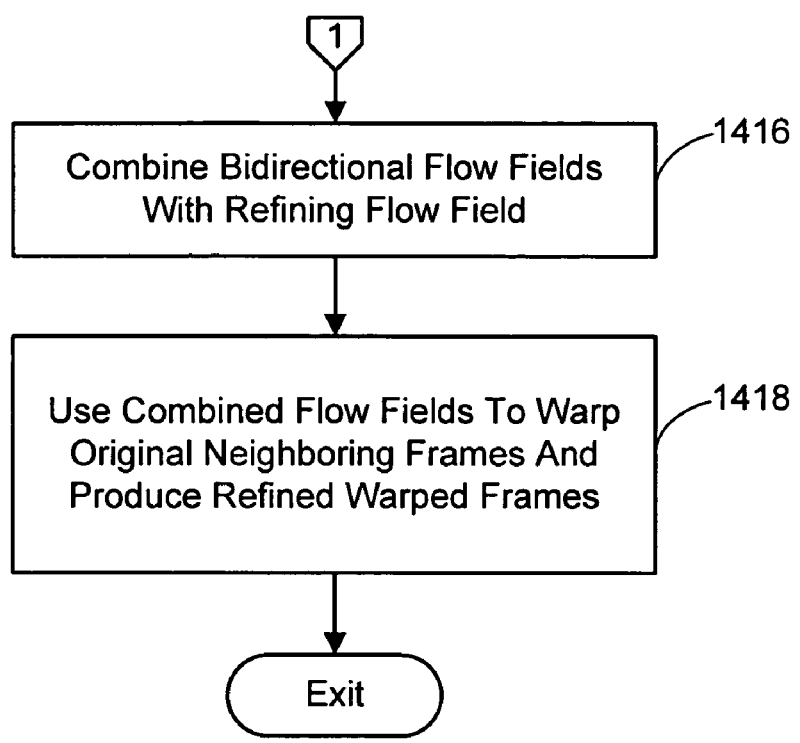

Accordingly, referring to the diagram of FIG. 13 and the process flow chart of FIGS. 14A-B, for the case where the current frame of the precursor video under consideration was captured at a short exposure $S_k$ with adjacent frames captured at long exposures ($L_{k-1}$ (1300) and $L_{k+1}$ (1302)), and where the preceding and subsequent exposures are different from one another, the second phase of the HDR stitching process is as follows.

1. First determine whether $expL_{k-1}>expL_{k+1}$ or $expL_{k-1}<expL_{k+1}$ (process action 1400). If it is determined that $expL_{k-1}<expL_{k+1}$, then in process action 1402 $L_{k-1}$ (1300) is boosted to match the intensity range of $L_{k+1}$ (1302), thereby producing $L_{k-1(Boost)}$ (1304). If, however, it is found that $expL_{k-1}>expL_{k+1}$, then in process action 1404 $L_{k+1}$ (1302) is boosted to match the intensity range of $L_{k-1}$ (1300), thereby producing $L_{k+1Boost}$ (1306). It is noted that the alternate nature of the foregoing boosting procedure is represented in FIG. 13 by using broken line boxes.

2. The bidirectional flow fields (forward warp $f_{k,F}$ (1308) for $L_{k-1}$ (1300) and backward warp $f_{k,B}$ (1310) for $L_{k+1}$ (1302)) are computed using the aforementioned gradient based technique (process action 1406). These flow fields are then used to warp the respective images to produce two images-namely $L_{k*(Boost)}^{B}$ (1312) and $L_{k*(Boost)}^{F}$ (1314) (where the (Boost) subscript designator indicates the image may be based on an intensity boosted frame or not) in process action 1408, one of which will be based on a boosted version of the original frame from the precursor video. These images are combined in process action 1410 to produce an intermediate image (i.e., the aforementioned bidirectionally-warped frame $L_{k*}$ (1316)). This intermediate image should be close in appearance to an intensity boosted version of $S_k$ (1318) as described below.

3. The individual pixel intensities of $S_k$ (1318) are next boosted to match the average of the corresponding pixels of $L_{k-1}$ (1300) and $L_{k+1}$ (1302) in process action 1412. This operation produces the image $S_{k_{Boost}}$ (1320).

4. The aforementioned hierarchical global registration technique is employed in process action 1414 to compute the refining flow $f_{k*}$ (1322) that best maps $L_{k*}$ (1316) to $S_{k_{Boost}}$ (1320).

5. In process action 1416, the refining flow $f_{k*}$ (1322) is combined with $f_{k,F}$ (1308) and $f_{k,B}$ (1310) to produce composite flows $f'_{k,F} = f_{k*} * f_{k,F}$ (1334) and $f'_{k,B} = f_{k*} * f_{k,B}$ (1335). The composite flow fields are then used to warp $L_{k-1}$ (1300) to produce $L'_{k*}{}^F$ (1330), and warp $L_{k+1}$ (1302) to produce $L'_{k*}{}^B$ (1328) in process action 1418. As before, $S_k$, $L_{k*}{}^{F0}$, $L_{k*}{}^{B0}$, $L_{k*}{}^{40\ B}$, and $L_{k*}{}^{40\ F}$ are used to compute an HD image at time k.

3.1 Motion Estimation

As indicated previously, the bidirectional flow fields $f_{k,F}$ and $f_{k,B}$ are computed using a gradient based technique. This technique will now be described. Frame interpolation involves synthesizing the missing exposures at intermediate times using information from a pair of adjacent frames. To do this, a dense motion match is computed between equal exposures (e.g., $S_{k-1}$ and $S_{k+1}$) and this is used to warp pixel information forwards and backwards along the motion trajectories to produce an intermediate image (e.g., $S_k^*$). This procedure is also used to generate missing $L_{k*}$ frames from L neighbors.

The present motion estimation procedure consists of two stages: First, the two frames are globally registered by estimating an affine transform that maps one onto the other. Then, a gradient based optical flow is used to compute a dense motion field that forms a local correction to the global transform.

Rather than computing forward or backward flow fields at times k−1 or k+1, the bidirectional field is computed at the intermediate time k. This avoids the hole filling problems of forward warping when generating each interpolated frame. At each pixel in the output frame k, composite vectors are obtained that point into the subsequent frame k+1 and the preceding frame, k−1. These vectors are each the sum of affine and local components. The affine component is derived from the global warping parameters, re-scaled to warp either from k−1 to k or from k+1 to k, and the local component is generated by the symmetrical optical flow procedure.

For local motion estimation, a variant of the Lucas and Kanade [4] technique is used in a Laplacian pyramid framework. Techniques to handle degenerate flow cases can also be added by computing the eigenvalues of the matrix of summed partial derivatives and determining if it is ill-conditioned. Rather than simply warping one source image progressively towards the other at each iteration, both source images are warped towards the output time k and the residual flow vectors are estimated between these two warped images. As the residuals are accumulated down the pyramid, they give rise to a symmetric flow field centered at time k. This technique is augmented by including the global affine flow during the warping so the accumulated residuals are always represented in terms of a symmetrical local correction to this asymmetric global flow.

To obtain the final intermediate image (i.e., the interpolated frame), bicubic warping is used to transfer pixels along the appropriate vectors from times k−1 and k+1 to each location in the output frame. The forward and backward warped pixels are averaged if they are available. If only one is available, that pixel value is used as the value for the corresponding location in the interpolated frame. If both source pixels are outside the frame, the two pixels obtained using a zero motion vector are averaged together.

3.2 Hierarchical Homography

As indicated previously, a hierarchical global registration technique is employed to compute the refining flow $f_{k*}$. This novel technique will now be described. In general, the technique is used to refine registration between the interpolated frame (i.e., $L_{k*}$ in all cases) and the actual frame (i.e., either a long exposure frame $L_k$ or the intensity boosted version of a short exposure frame $S_{k_{Boost}}$). It is difficult to compare these images directly due to inevitable errors in the interpolation process used to create the $L_{k*}$ images. For example, errors can be caused because the motion occurring between the time each of the neighboring frames used to create $L_{k*}$ are captured may not be uniform. Constraining the flow is desirable at this point as it reduces the possibility of erroneous mapping at unreliable regions of saturated and low contrast pixels.

To accomplish the foregoing task what will be referred to as a hierarchical homography will be employed. The idea of hierarchical homography is shown in FIG. 15, which is simplified to illustrate two levels and one quadrant only. At the highest resolution, i.e., level 0 (1500), full frame registration is performed to find the best 2D perspective transform (i.e., homography) between two input images using conventional methods-thus producing homography $H_0$ (1502). The reference image (Image 1 (1504)) is then broken up into overlapping quadrants 1506 shown in dotted lines. A 5 to 20 percent overlap is reasonable. In tested versions of the invention, a 10 percent overlap was used with success. It is noted that the reference image 1504 is either $L_k$ or $S_{k_{Boost}}$ in the HDR video generating process.

If there is insufficient intensity variation within the quadrant 1506 (which was set at a threshold of about 10 gray levels in tested versions of the present process), it is left alone. Otherwise, its global motion is refined by performing a full image registration between that quadrant 1506 of the reference image 1504 and the appropriately sampled counterpart region 1508 from the second image 1510 (which is $L_{k*}$ in the HDR video generating process) to find the best 2D perspective transform (i.e., homography) between the two regions. The boundary of the sub-image 1508 from the second image 1510 is computed based on $H_0$ 1502. In the example shown in FIG. 15, this refined transform between the sub-image pair 1506 and 1508 is referred to as $H_{1,1}$ (1512) where the first subscript refers to the level and the second subscript refers to the quadrant number (i.e., 1-4). The refinement procedure is repeated for each quadrant meeting the aforementioned intensity variation test.

While two levels were used with success in tested versions of the HDR video generation process, the forgoing refinement procedure could be extended further into additional levels to further refine the registration of the images. For example, extending the technique to a third level simply entails taking one of the previously processed quadrants of the reference image (which had passed the intensity variation test) and dividing it into quadrants. Each of the new quadrants is put to the intensity variation test. If it does not pass the test again it is left alone. However, if it passes the test, $H_{1,i}$ (where i=quadrant index under consideration in level 1) would be employed to define the boundary of the corresponding region in Image 2. A full image registration is then performed between the level 1 quadrant of the reference image under consideration and the appropriately sampled counterpart region from the second image to find the best 2D perspective transform (i.e., homography) between the two regions which would be designated as $H_{2,i}$.

Figures 16A, 16B, 16C:
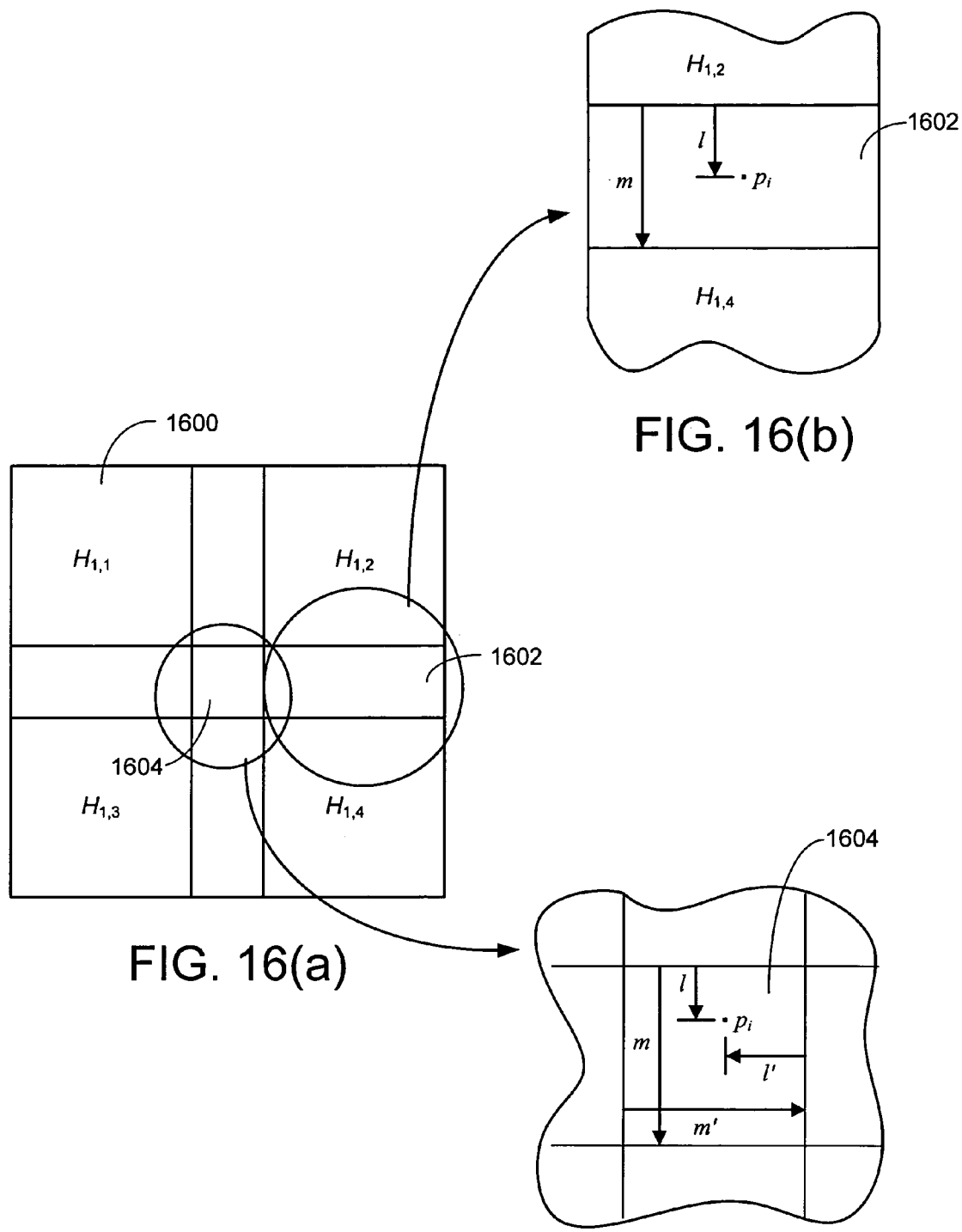
FIGS. 16(a)-(c) are diagrams illustrating the geometry of the feathering procedure of the hierarchical homography process.

Thus, in general, the refinement procedure is repeated for all the levels and all the quadrants of each level. Once complete, the resulting full image refining flow $f_{k^*}$ is then computed using the local homographies computed between each region of the images. At and near the boundaries of each quadrant, their flows are feathered (i.e., weight averaged) to minimize flow discontinuities. For example, referring to FIGS. 16(a)-(c), assume two refinement levels and that all the quadrants passed the intensity variation test. As depicted in FIG. 16(a), local homographies ($H_{1,1}$, $H_{1,2}$, $H_{1,3}$, $H_{1,4}$) have been computed for each quadrant. For the regions contained completely within one of the quadrants (such as region 1600), and their counterparts in the other image, the local homography is used to compute the flow for the pixels effected in the conventional manner.

However, for regions in the reference image where two quadrants overlap (such as region 1602) a 1D linear weighting technique is employed to "feather" the flow map for those pixels contained in the overlap region. Essentially, the closer the pixel is to a non-overlapping region, the more it is weighted by that portion. This weighting technique will be described in reference to FIG. 16(b), which shows an enlarged view of the overlap region 1602. For every pixel in the overlap region, the overlap distance m is used, along with the distance l defining the shortest distance from one of the borders of the overlap region to the pixel under consideration $p_i$, to establish $p'_i$, which is in turn used to compute the flow for that pixel in the full image refining flow field $f_k^*$. More particularly, using the example shown in FIG. 16(b) where the distance l is measured as the shortest distance between the border of the overlap region adjacent the exclusive "$H_{1,2}$ region" and $p_i$, $$p'_i = \frac{m-l}{m} p_{1,2} + \frac{l}{m} p_{1,4} \qquad (7)$$

where $p_{1,2} = H_{1,2} p_i$ and $p_{1,4} = H_{1,4} p_i$.

In the central region of the reference image where all four quadrants overlap, such as region 1604 that is shown in an enlarge view in FIG. 16(c), a 2D linear weighting technique is employed to feather the flow map for those pixels contained in that region. In this case, the overlap distances m and m' are used, along with the distance l defining the distance from a first of the borders of the central overlap region to the pixel under consideration $p_i$ and distance l' defining the distance from one of the borders adjacent of the first border to $p_i$, to establish $p'_1$. More particularly, $$p'_i = ((m-l)/m)*(l'/m')*H_{1,1}p_i + ((m-l)/m)*((m'-l')/m')$$
$$*H_{1,2}p_i + (l/m)*(l'/m')*H_{1,3}p_i + (l/m)*((m'-l')/m')$$
$$*H_{1,4}p_i. \qquad (8)$$

Figure 17A:
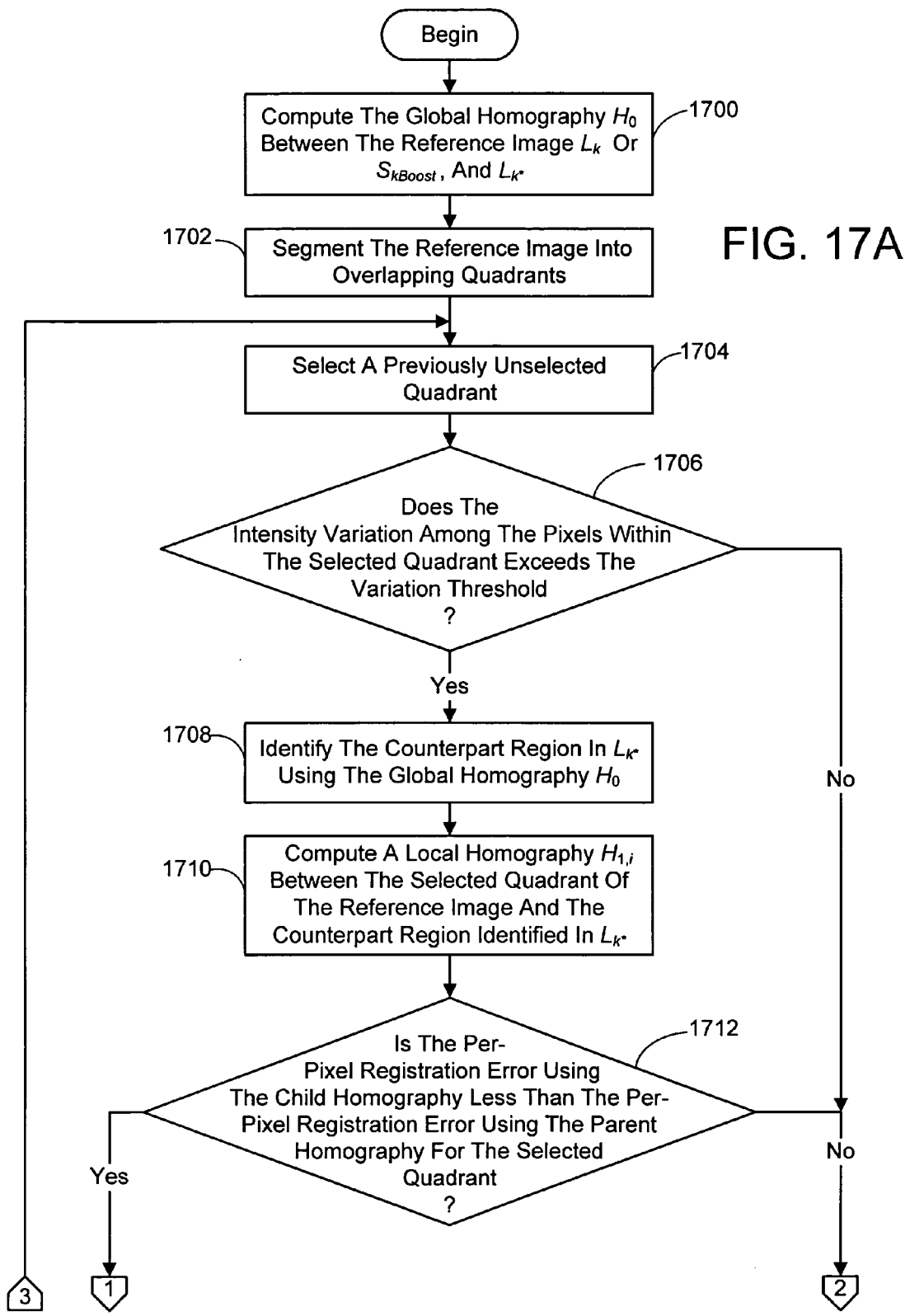
FIGS. 17A-B are a flow chart diagramming one embodiment of the hierarchical homography process using the example of 2 hierarchical levels.
Figure 17B:
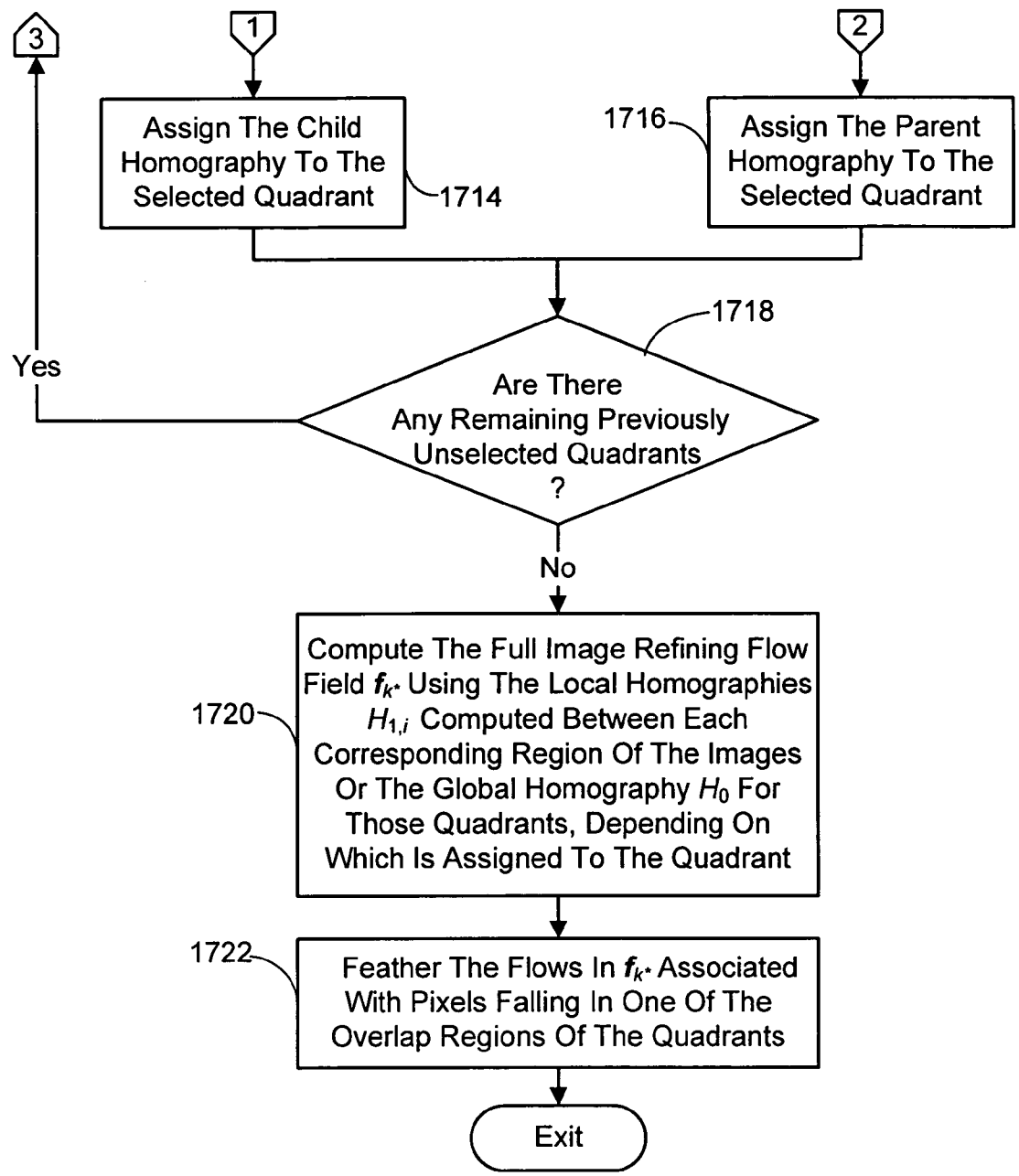

Referring now to the flow chart of FIGS. 17A-B, the foregoing hierarchical homography procedure will be summarized using the example of 2 hierarchical levels (i.e., levels 0 and 1). The procedure begins by computing homography $H_0$ between the reference image $L_k$ or $S_{k_{Boost}}$ (as the case may be) and $L_{k^*}$ (process action 1700). The reference image is then segmented into overlapping quadrants (process action 1702), and a previously unselected one of the quadrants is selected (process action 1704). It is next determined whether the intensity variation among the pixels within the selected quadrant exceeds a prescribed variation threshold (process action 1706). If it does, then in process action 1708, the counterpart region in $L_{k^*}$ is identified using the global homography $H_0$. In this context, $H_0$ is the parent homography. A local homography $H_{1,i}$ (where i refers to the selected quadrant index) is computed between the selected quadrant of the reference image and the counterpart region identified in $L_{k^*}$ (process action 1710). In this context, $H_{1,i}$ is a child homography. It is next determined if the per-pixel registration error using the child homography is less than the per-pixel registration error using the parent homography for the same quadrant (process action 1712). If so, the computed child homography is assigned to the selected quadrant (process action 1714). Otherwise, if it is determined the per-pixel registration error using the child homography is not less than the per-pixel registration error using the parent homography, or if in process action 1706 it was determined that the intensity variation among the pixels within the selected quadrant did not exceed the prescribed variation threshold, the parent homography is assigned to the selected quadrant (process action 1716), i.e., the child inherits from its parent. It is next determined whether there are any remaining previously unselected quadrants (process action 1718). If there are more quadrants to process, then process actions 1704 through 1718 are repeated. However, if it is found there are no more quadrants to process, then in process action 1720, the full image refining flow field $f_{k^*}$ is computed using the local homographies $H_{1,i}$ computed between each corresponding region of the images, or the global homography $H_0$, depending on which is assigned to the quadrant. Finally, in process action 1722, the flows in $f_{k^*}$ associated with pixels falling in one of the overlap regions of the quadrants are feathered to minimize flow discontinuities.

3.3 Radiance Map Recovery

In this section, the process of combining the input images with their warped neighbors to produce a radiance map is described. Several techniques have been proposed to do this [2, 6, 9]. In each of these techniques, the input images are converted to radiance images using the known exposure value and a computed camera response function. The final radiance value at a pixel is then computed as the weighted sum of the corresponding pixels in these radiance images. As indicated earlier, the response function of the camera $F_{response}$ is preferably computed using the technique of [6]. An example weighting function $fw$, derived from this technique is shown in FIG. 18(a) by a graph plotting global weight versus pixel intensity. It is noted, however, that existing approaches assume perfectly registered input images. Due to the possibility of mis-registrations in the first part of the HDR stitching process, perfect registration is not assumed in this part of the present process. Instead the procedure is made more tolerant to errors in pixel registration by using radiance values derived from the pixels of not only the input frame under consideration, but also the uni-directionally warped left frame, uni-directionally warped right frame, and the two bi-directionally warped frames created from the left and right neighbors respectively. A logic protocol is employed which determines whether a pixel in the final radiance map is derived from the radiance value of one or a combination of two or more values taken from the corresponding pixels in the foregoing images. Generally, this decision is made based on the intensity of the pixel in the input image.

Figure 19A:
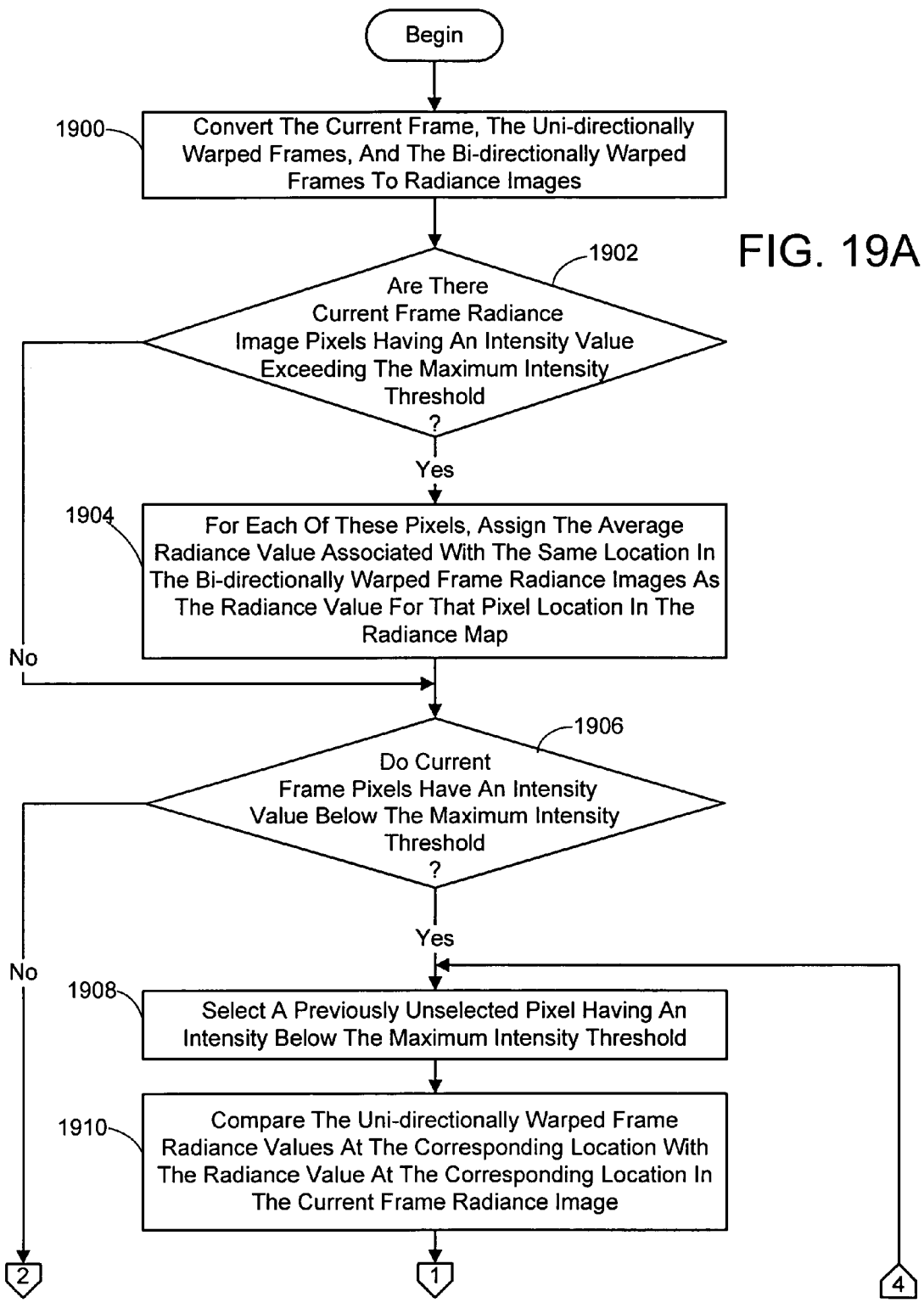
FIGS. 19A-C are a flow chart diagramming one embodiment of the radiance map computation procedure of FIG. 2 for the case where the frame under consideration is a longer exposure frame and the adjacent frames are shorter exposure frames.
Figure 19B:
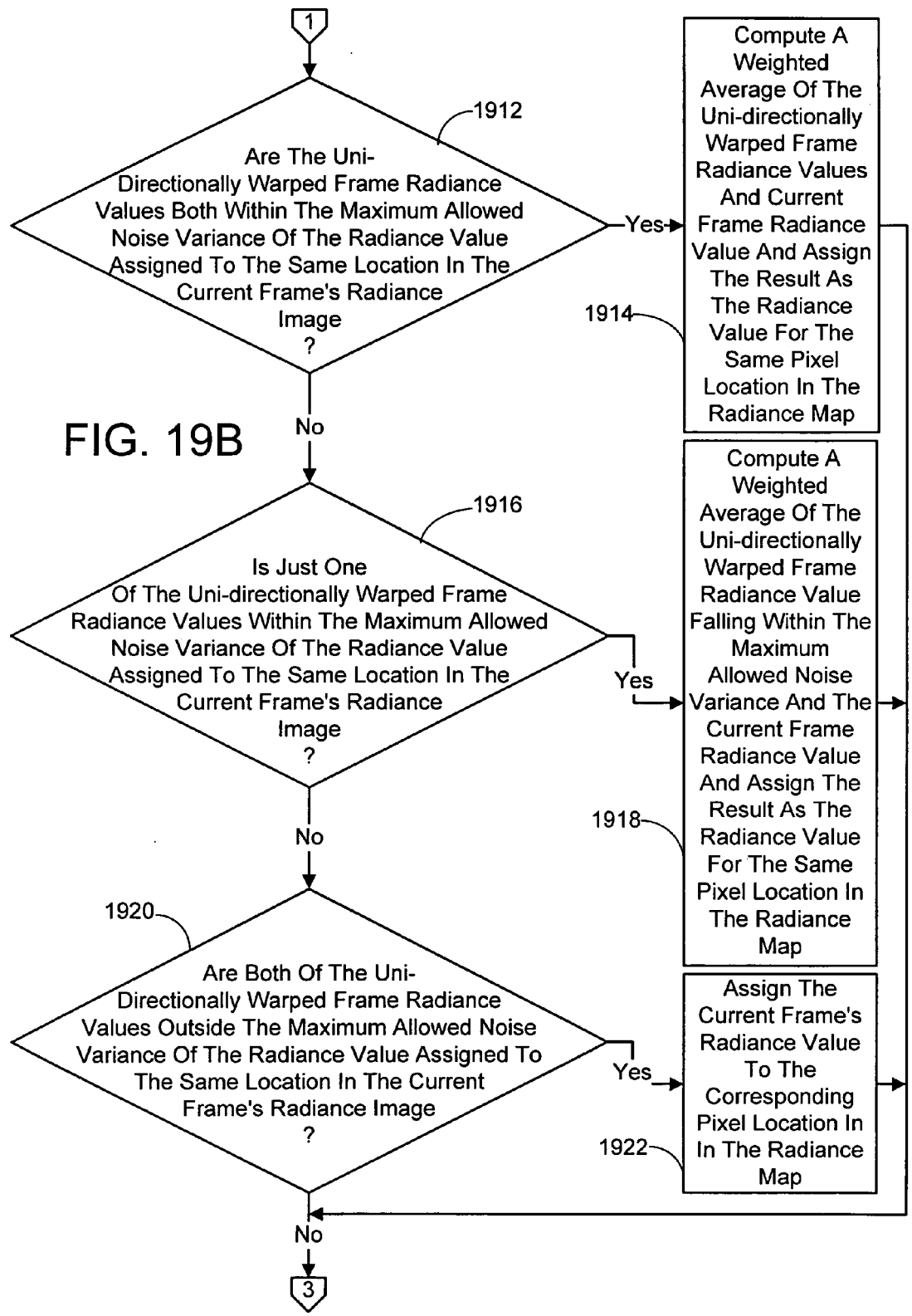
Figure 19C:
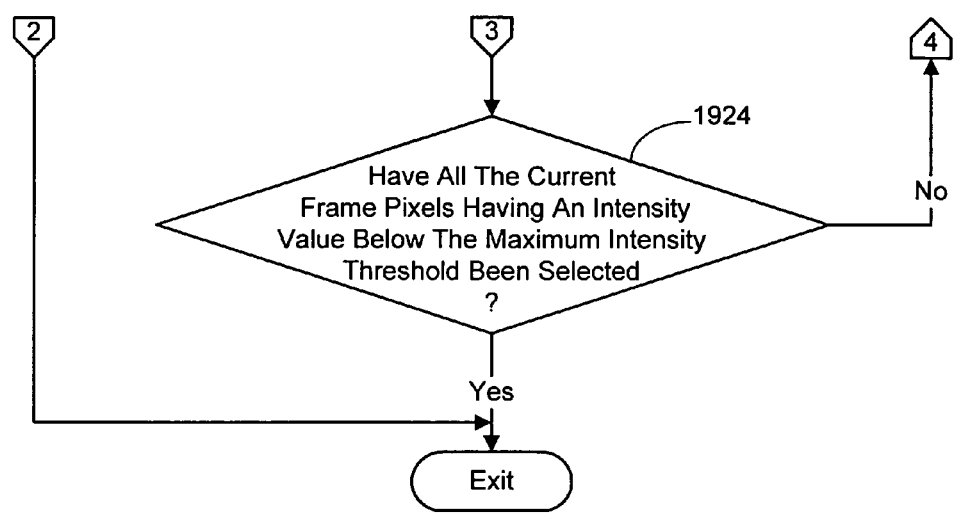

More particularly, referring to FIGS. 19A-C, the radiance map recovery employed in the HDR stitching is accomplished as follows for the case where the input image is a long exposure frame and the adjacent frames are short exposure frames.
1. First, L, $S_*^{FO}$, $S_*^{BO}$, $S'_*^B$, and $S'_*^F$ are converted into radiance images (process action 1900) using the response function $F_{response}$ and the respective exposure values of the images using conventional methods where in general $$R = F_{response}^{-1}\left(\frac{p}{\exp}\right)$$

with R being the radiance of a pixel, p being the pixel intensity and exp being the exposure level. These radiance images are denoted by $\hat{L}$, $\hat{S}_*^{FO}$, $\hat{S}_*^{BO}$, $\hat{S}'_*^B$, and $\hat{S}'_*^F$ respectively. Note that the subscript k is omitted here for notational convenience.
2. The pixels in the input image L that are above a maximum intensity value representing the maximum intensity that can be captured in L (e.g., 255) are then identified as being saturated in process action 1902. These pixels are assumed to produce poor registration with adjacent frames. Instead of using these values in the final radiance map, values from the bidirectionally warped frame $\hat{S}'_*^B$ and $\hat{S}'_*^F$ are employed (process action 1904). In tested versions of the present radiance map recovery procedure, the radiance values from $\hat{S}'_*^B$ and $\hat{S}'_*^F$ were averaged to establish the value for the pixel in the final radiance map.
3. Next, pixels in the input image L that fall in an intensity range below the prescribed maximum are identified (process action 1906) and a previously unselected one of them selected (process action 1908). These pixels represent regions of the scene that could be reasonably exposed in either a long or short exposure frame. For each of the pixels identified, the radiance values from $\hat{S}_*^{FO}$ and $\hat{S}_*^{BO}$ are compared with the corresponding pixel in $\hat{L}$ (process action 1910). If it is found that the radiance values from both $\hat{S}_*^{FO}$ and $\hat{S}_*^{BO}$ are below a prescribed maximum allowed noise variance from the radiance value of $\hat{L}$ (process action 1912), then a weighted average of all three is computed and used as the radiance value for that pixel location in the final radiance map (process action 1914). The weighted average radiance is computed as follows:

$$R = \frac{f_{WM}(p_F, p_c)p_F + f_{WM}(p_B, p_c)p_B + f_W(p_c)}{f_{WM}(p_F, p_c) + f_{WM}(p_B, p_c) + f_W(p_c)} \quad (9)$$

where the subscripts c, F, and B refer to pixels in the current, left warped, and right warped radiance images respectively. In this case, the current image is $\hat{L}$, the left warped image is $\hat{S}_*^{FO}$, and the right warped image is $\hat{S}_*^{BO}$. $f_{WM}(p_w, p_c) = f_M(|p_w - p_c|)f_W(p_w)$ is the weight function $f_W$ modulated by $f_M$ where $f_M()$ is defined by $$f_M(\delta) = \begin{cases} 2\left(\frac{\delta}{\delta_{max}}\right)^3 - 3\left(\frac{\delta}{\delta_{max}}\right)^2 + 1 & \text{if } \delta < \delta_{max} \\ 0 & \text{otherwise} \end{cases} \quad (10)$$

which is a modulation function that downplays warped radiance values that are too different than the corresponding input radiance value. $\delta^{max}$ is a user specified parameter that represents the aforementioned maximum allowed noise variance. In tested versions of the present radiance map recovery procedure, the maximum allowed noise variance was set to 16 intensity levels. An example of the modulation function is plotted in the graph shown in FIG. 18(*b*).

If, however, one of the radiance values from $\hat{S}_*^{FO}$ and $\hat{S}_*^{BO}$ is found to be above the maximum noise variance (process action 1916), it is thrown out and the radiance value used in the final radiance map for that pixel location is computed as the weighted average the value from $\hat{L}$ and the remaining value from either $\hat{S}_*^{FO}$ and $\hat{S}_*^{BO}$ (process action 1918). This falls out of Eq. (10) because the terms involving the radiance value from $\hat{S}_*^{FO}$ and $\hat{S}_*^{BO}$ which are found to be outside the maximum allowed noise variance are zeroed. Thus, the weighted average is computed using Eq. (9) with the remaining radiance values.

Finally, if it is found that both the radiance values from $\hat{S}_*^{FO}$ and $\hat{S}_*^{BO}$ are outside the maximum allowed noise variance (process action 1920), then both values are thrown out and in accordance with Eq. (10) and the radiance value used in the final radiance map for that pixel location is taken from $\hat{L}$ directly (process action 1922).

It is next determined in process action 1924 if there are any pixels identified as having an intensity below the maximum intensity threshold that have not yet been selected and processed. If there are, process actions 1908 through 1924 are repeated. Otherwise the process ends.

Figure 20A:
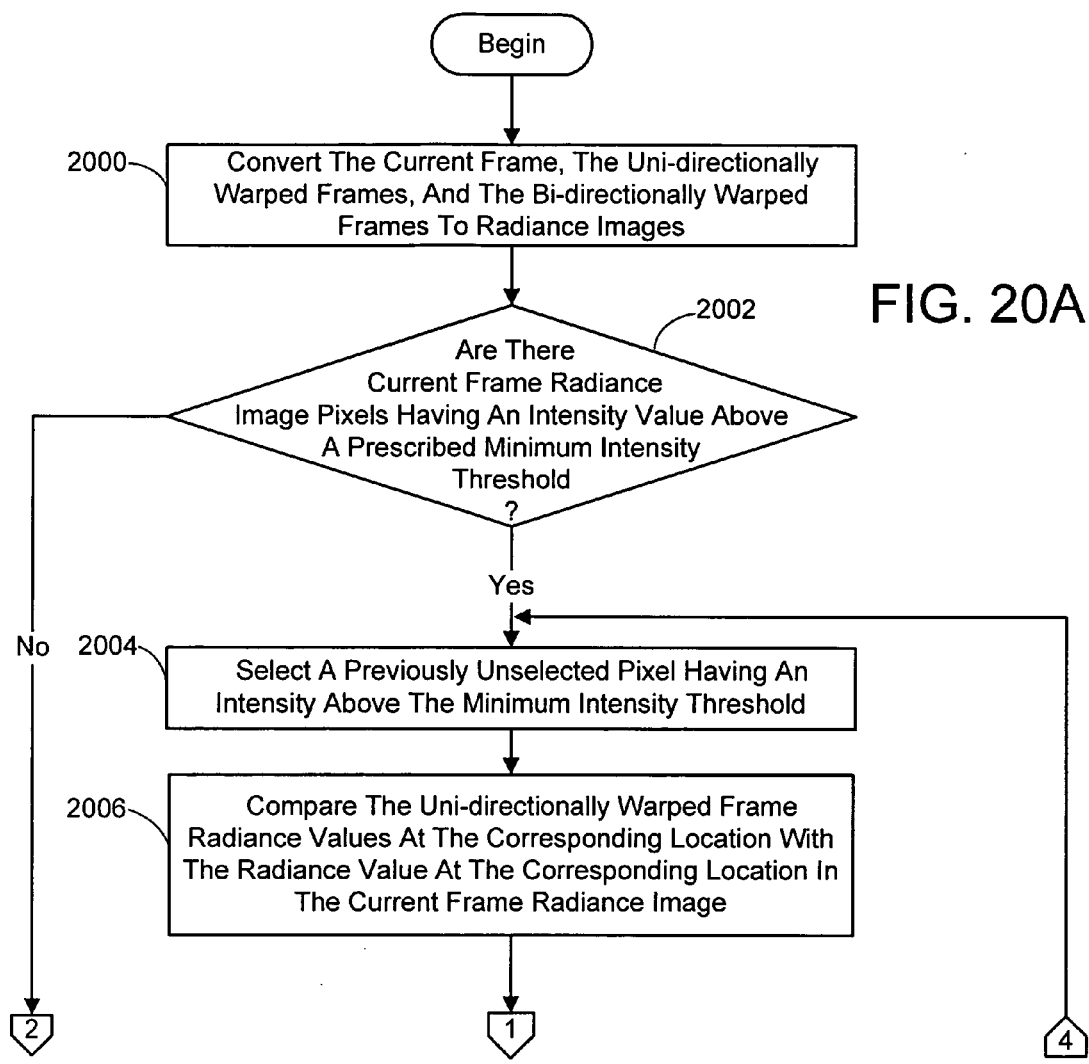
FIGS. 20A-C are a flow chart diagramming one embodiment of the radiance map computation procedure of FIG. 2 for the case where the frame under consideration is a shorter exposure frame and the adjacent frames are longer exposure frames.
Figure 20B:
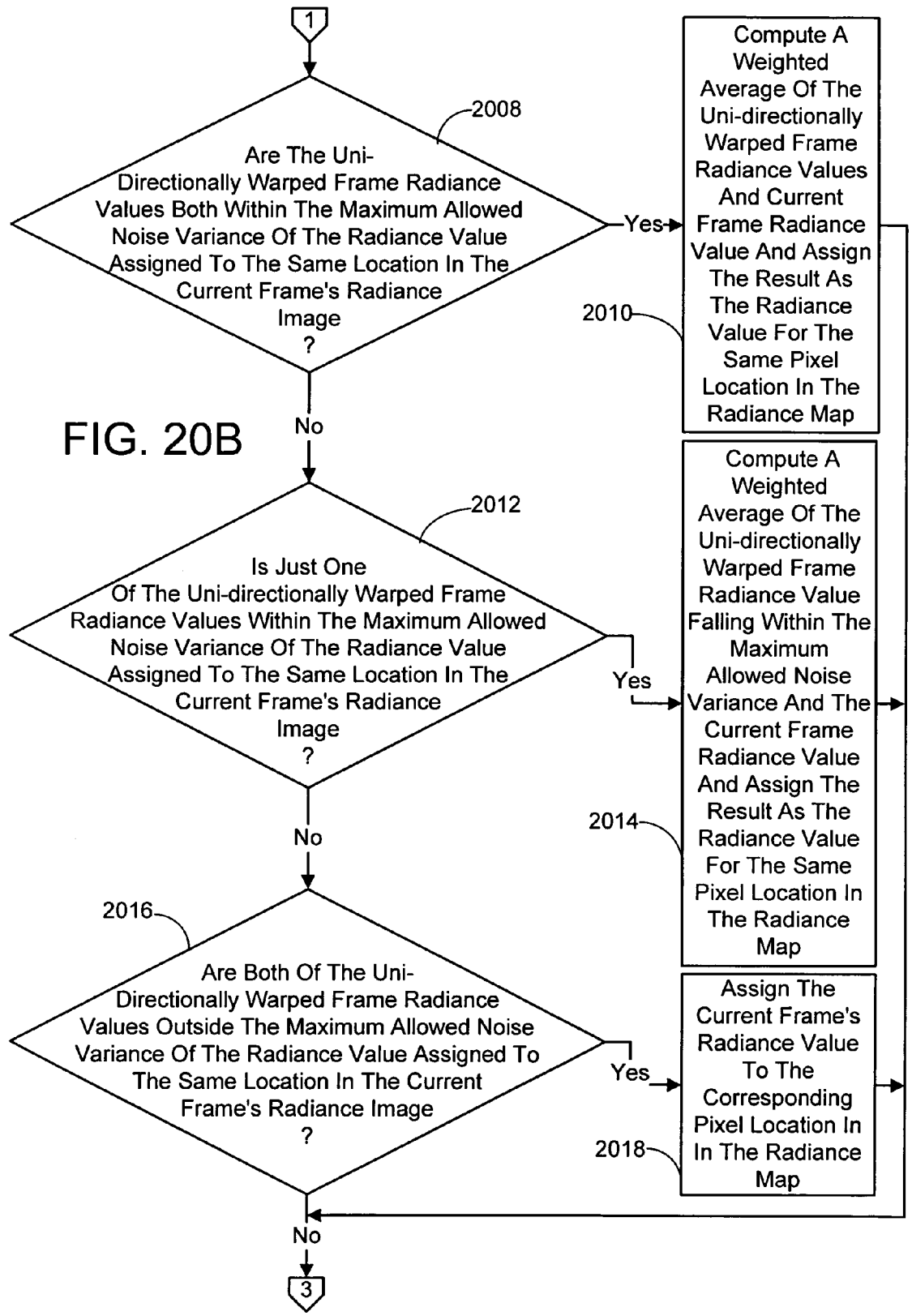
Figure 20C:
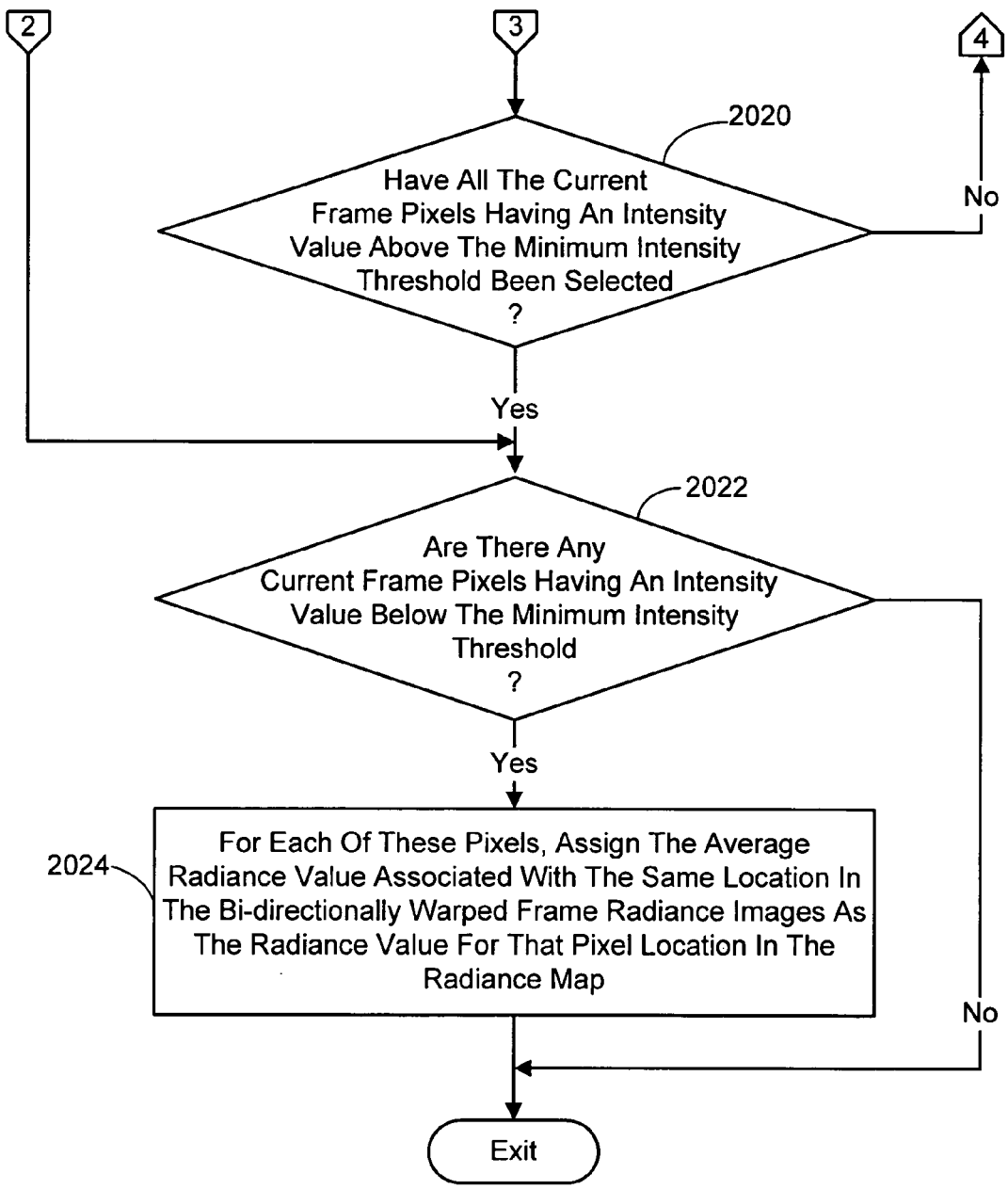
Figures 21A, 21B, 21C, 21D:
FIGS. 21(a)-(d) are a series of images showing an example of the radiance map computation procedure logic protocol, where a short exposure input frame, the resulting combined bidirectionally warped image, and the resulting uni-directionally warped left and right frames are depicted, respectively, with just those pixels that were chosen to contribute to the final radiance map visible.

Referring now to FIGS. 20A-C, in the case where the input frame under consideration is a short exposure frame and the adjacent frames are long exposure frames, the radiance map recovery employed in the HDR stitching is accomplished as follows.
1. First, S, $L_*^{FO}$, $L_*^{BO}$, $L'_*^B$, and $L_*'^F$ are converted into radiance images (process action 2000). These radiance images are denoted by $\hat{S}$, $\hat{L}_*^{FO}$, $\hat{L}_*^{BO}$, $\hat{L}'_*^B$, and $\hat{L}'_*^F$ respectively.
2. Next, pixels in the input image S that fall an intensity range above a prescribed minimum (e.g., 16 in tested versions of the present radiance map recovery procedure) are identified (process action 2002) and a previously unselected one of them selected (process action 2004). These pixels represent regions of the scene that could be reasonably exposed in either a long or short exposure frame. For each of these pixels, the radiance values for the pixel from $\hat{L}_*^{FO}$ and $\hat{L}_*^{BO}$ are compared with the corresponding pixel in $\hat{S}$ (process action 2006). If it is found that the radiance values from both $\hat{L}_*^{FO}$ and $\hat{L}_*^{BO}$ are below the aforementioned maximum allowed noise variance from the radiance value of $\hat{S}$ (process action 2008), then a weighted average of all three is computed and used as the radiance value for that pixel location in the final radiance map (process action 2010). The weighted average radiance is computed as described above using Eq (9).

If, however, one of the radiance values from $\hat{L}_*^{FO}$ and $\hat{L}_*^{BO}$ is found to be outside the maximum allowed noise variance (process action 2012), it is thrown out and the radiance value used in the final radiance map for that pixel location is computed as the weighted average the value from $\hat{S}$ and the remaining value from either $\hat{L}_*^{FO}$ and $\hat{L}_*^{BO}$ (process action 2014). The weighted average is computed using Eq. (9) where the terms involving the radiance value from $\hat{L}_*^{FO}$ and $\hat{L}_*^{BO}$ which has been thrown out are zeroed in accordance with Eq (10).

Finally, if it is found that both the radiance values from $\hat{L}_*^{FO}$ and $\hat{L}_*^{BO}$ are outside the maximum allowed noise variance (process action 2016), then both values are thrown out in accordance with Eq. (10), and in process action 2018 the radiance value used in the final radiance map for that pixel location is taken from $\hat{S}$ directly, in accordance with Eq. (9).

It is next determined in process action 2020 if there are any pixels identified as having an intensity above the minimum intensity threshold that have not yet been selected and processed. If there are, process actions 2004 through 2020 are repeated. If not, the process continues as follows.

3. In process action 2022, pixels in the input image S that are below the aforementioned minimum intensity value are identified. These pixels are assumed to produce poor registration with adjacent frames. Instead of using these values in the final radiance map, values from the bidirectionally warped frames $\hat{L}'^B_*$ and $\hat{L}'^F_*$ are employed (process action 2024). In tested versions of the present radiance map recovery procedure, the radiance values from $\hat{L}'^B_*$, and $\hat{L}'^F_*$ were averaged to establish the value for the pixel in the final radiance map.

By way of an example of the foregoing radiance map recovery procedure logic protocol, FIGS. 21(a)-(d) show for a short exposure input frame and the bidirectional (created by averaging the values from $\hat{L}'^B_*$, and $\hat{L}'^F_*$), left and right warped frames derived from the neighboring long exposure frames, respectively, those pixels that were chosen to contribute to the final radiance map.

4.0 Temporal Tone Mapping

Tone mapping is used to convert floating point radiance maps into an 8-bit representation suitable for rendering in typical systems. This process must reduce the dynamic range of each frame while also maintaining a good contrast level for both brightly and darkly illuminated regions. In addition, there must be consistency of the transform among captured views so that there are no temporal artifacts such as flickering.

While any existing tonemapping procedure could be employed for this purpose, the present HDR video generation system makes use of a modified version the tonemapper presented by [8], which is based on the photographic technique of dodging and burning. In general, the tonemapping process begins by converting the radiance image to CIE space via conventional methods and recovering the chromaticity coordinates. The luminance image is then processed to compress the dynamic range. Finally, the chrominance is re-inserted and the CIE space image converted to produce the final byte-range RGB image. As part of this tonemapping process, certain global parameters have to be set to control the overall brightness balance. Essentially, a statistical analysis of the input image being tonemapped is performed to decide how to set these global parameters. While this process works well for tonemapping images, its direct application to the present HDR video generation system would be problematic as flickering could result from the fact that each frame would be analyzed in isolation.

This problem is solved in the present system by essentially carrying over the statistics from frame to frame. More specifically, the present temporally-adapted tonemapper includes computing the average and maximum luminances (i.e., the aforementioned global parameters), which control the transfer function that provides a good initial luminance mapping, using information from both the frame under consideration and the previous frame. Thus, the log average luminance is given by $$F_w = \exp\left(\frac{1}{N}\sum_{x,y,i} \log(\varepsilon + F_i(x, y))\right) \quad (11)$$

where $\varepsilon$ is a small value (e.g., $10^{-6}$), N is the total number of pixels in both frames, and $F_i$ is the causal temporal neighborhood consisting of frames i at times k−1 and k. Similarly, the maximum luminance is determined by considering pixels in both frames. As stated above, using a set of frames to control the global mapping helps to prevent flicker in the tonemapped sequence.

It is noted that while statistics from just the current and immediately preceding frames were employed with success to prevent the flickering problem in tested version of the present HDR video system, additional preceding frames could also be included in the average and maximum luminance computations if desired.

5.0 Results

Figure 22:
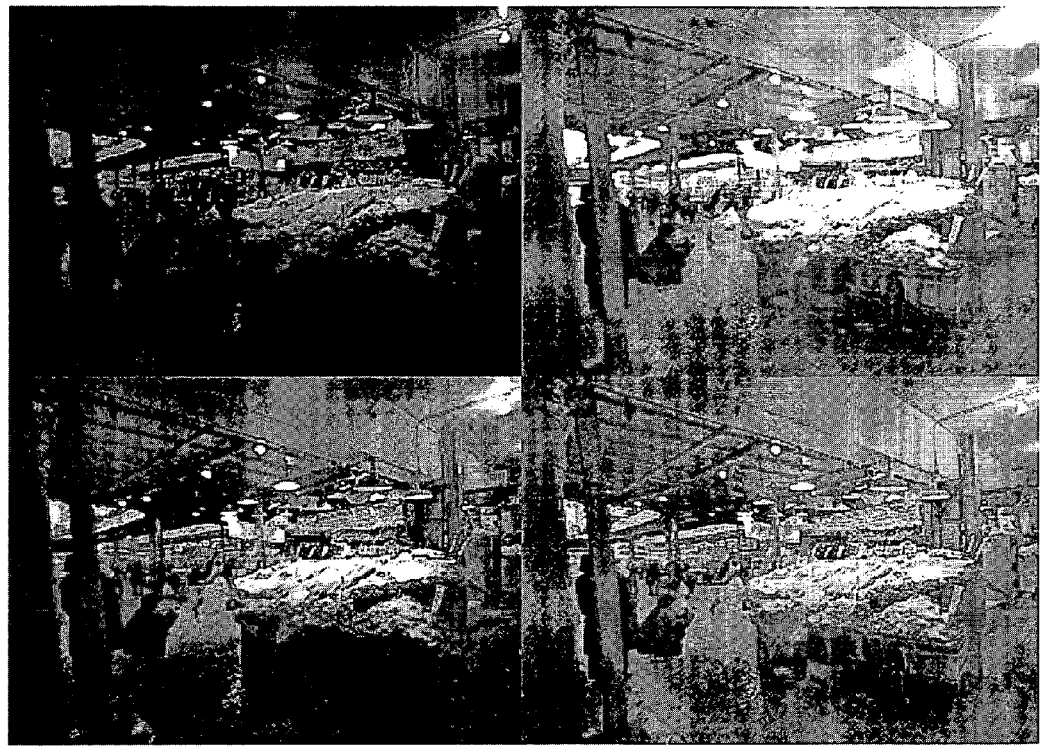
FIG. 22 is a series of images showing representative stills from a fish market scene, where in each scene the top left quadrant is a short exposure frame, the top right quadrant is a long exposure frame, the bottom left quadrant shows what the frame would look like for an exposure equal to the geometric mean of the short and long exposures, and the image in the bottom right quadrant is generated using the process of FIG. 2 according to the present invention.
Figure 23:
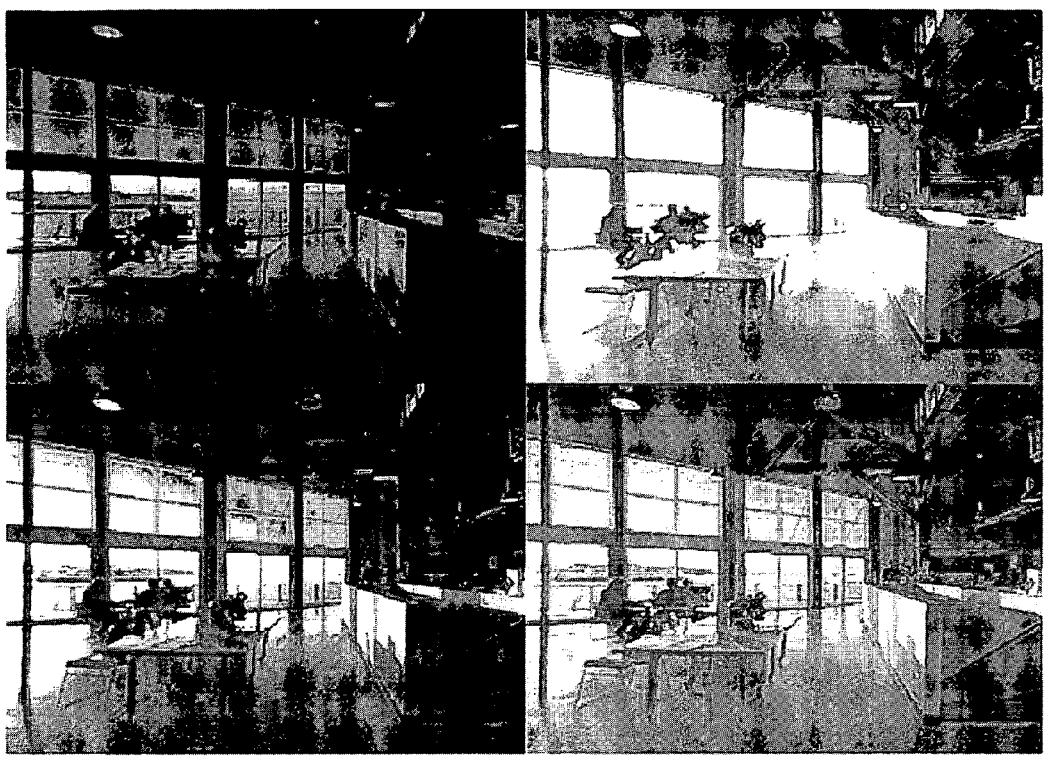
FIG. 23 is a series of images showing representative stills from a harbor scene, where in each scene the top left quadrant is a short exposure frame, the top right quadrant is a long exposure frame, the bottom left quadrant shows what the frame would look like for an exposure equal to the geometric mean of the short and long exposures, and the image in the bottom right quadrant is generated using the process of FIG. 2 according to the present invention.

In this section, we show results for three different dynamic scenes: a fish market, a harbor, and a drive along a busy street. FIGS. 22 and 23 show representative stills from the fish market and harbor scenes. For each scene, the top left quadrant is a short exposure frame, and the top right quadrant is a long exposure frame. The bottom left quadrant shows what the frame would look like for an exposure equal to the geometric mean of the short and long exposures. This is reasonable, given that radiance is normally handled in logarithmic space. The image in the bottom right quadrant is generated using our method.

Fish market scene. A snapshot from the fish market scene can be seen on the left of FIG. 22. While the single exposure version looks reasonable, there is some saturation (especially in the middle and upper right corner) as well as low contrast areas. In the frame generated using our HDR approach, good details can be seen almost everywhere (except for the base of the counter, where even the long exposure frame shows little detail).

Harbor scene. The video was captured inside an office overlooking a harbor. In the video, the ferry can be seen moving outside the window while some human activity can be observed inside the office. As shown on the right hand side of FIG. 23, the single exposure has both significantly large saturated and low contrast regions. On the other hand, in the frame generated using our approach, the ferry and water can be clearly seen. More details can also be seen inside the office.

Figure 24:
FIG. 24 is a series of images of a driving scene, which in the top row represent a portion of an input video with alternating short and long exposures, and in the bottom row show the portion of the HDR video generated from the input images in accordance with the present invention.

Driving scene. The results for the driving scene can be seen in FIG. 24. The top row shows a portion of the input video sequence with it alternating shorter and longer exposures, while the bottom row shows the HDR video frames generated from these frames. In this example, the driver drives through a busy street at about 25 mph. This was a particularly difficult scene because occasionally there is large frame to frame displacement due to the fast motion of the driver's hand. Our optical flow algorithm sometimes fails for such large motions, but this problem could be alleviated using a higher frame rate camera.

Looking at the results, you can see that our technique produces videos with increased dynamic range while handling reasonably large amounts of visual motion. For very fast motions, however, given our current low sampling rate of 15 frames per seconds, our technique sometimes produces artifacts. However, using a camera with a faster capture rate would mitigate this problem.

6.0 REFERENCES

[1] L. Bogoni. Extending dynamic range of monochrome and color images through fusion. *Int'l Conf. on Pattern Recognition*, vol. 3, pages 7-12, September 2000.

[2] F. Durand and J. Dorsey. Fast bilateral filtering for the display of high dynamic range images. *ACM Trans. on Graphics (TOG)*, 21(3):257-266, 2002.

[3] P. E. Debevec and J. Malik. Recovering high dynamic range radiance maps from photographs. *Proc. of SIGGRAPH 97*, pages 369-378, August 1997.

[4] R. Fattal, D. Lischinski, and M. Werman. Gradient domain high dynamic range compression. *ACM Trans. on Graphics*, 21(3):249-256, 2002.

[5] B. D. Lucas and T. Kanade. An iterative image registration technique with an application in stereo vision. *In Int'l Joint Conf. on Artificial Intelligence*, pages 674-679, 1981.

[6] S. Mann, C. Manders, and J. Fung. Painting with Looks: Photographic images from video using quantimetric processing. In *ACM Multimedia*, December 2002.

[7] T. Mitsunaga and S. K. Nayar. Radiometric self calibration. In *IEEE Conf. on Computer Vision and Pattern Recognition*, volume 1, pages 374-380, June 1999.

[8] T. Mitsunaga and S. K. Nayar. High dynamic range imaging: Spatially varying pixel exposures. In *IEEE Conf. on Computer Vision and Pattern Recognition*, volume 1, pages 472-479, June 2000.

[9] E. Reinhard, M. Stark, P. Shirley, and J. Ferwerda. Photographic tone reproduction for digital images. *ACM Trans. on Graphics*, 21(3):267-276, 2002.

[10] Y. Tsin, V. Ramesh, and T. Kanade. Statistical calibration of CCD imaging process. In *Int'l Conf. on Computer Vision*, volumeI, pages 480-487, July 2001.

Wherefore, what is claimed is:

1. A computer-implemented process for generating high dynamic range (HDR) video from an image sequence captured while varying the exposure of each frame, said process comprising:
   a setting step for setting the exposure for each frame of the video image sequence prior to it being captured as a function of the pixel brightness distribution, wherein the frames of the video image sequence alternate between one captured at a shorter exposure and one captured at a longer exposure; and
   for each frame of the video after a prescribed number of initiating frames,
      an identifying step for identifying corresponding pixels between the frame under consideration and both preceding and subsequent neighboring frames representing a corresponding pixel set, said identifying comprising,
         a first warping step for uni-directionally warping the immediately preceding neighboring frame to produce an approximate registration of the preceding frame with the frame under consideration,
         a second warping step for uni-directionally warping the immediately subsequent neighboring frame to produce an approximate registration of the subsequent frame with the frame under consideration, and
         a third warping step for bi-directionally warping said preceding and subsequent frames to produce refined forward warped and backward warped frames representing approximate registrations of said neighboring frames with the frame under consideration; and
      for each set of corresponding pixels, a second identifying step for identifying at least one pixel in the set that represents a trustworthy pixel and an employing step for employing the pixel color information associated with the one or more identified trustworthy pixels to compute a radiance value for that set of pixels to form a radiance map representing a frame of the HDR video.

2. A computer-readable storage medium having computer-executable instructions stored thereon for generating high dynamic range (HDR) video from an image sequence captured while varying the exposure of each frame, said computer-executable instructions comprising:
   setting the exposure for each frame of the video image sequence prior to it being captured as a function of the pixel brightness distribution, wherein the frames of the video image sequence alternate between one captured at a shorter exposure and one captured at a longer exposure; and
   for each frame of the video after a prescribed number of initiating frames,
      identifying corresponding pixels between the frame under consideration and both preceding and subsequent neighboring frames representing a corresponding pixel set, said identifying comprising,
         uni-directionally warping the immediately preceding neighboring frame to produce an approximate registration of the preceding frame with the frame under consideration,
         uni-directionally warping the immediately subsequent neighboring frame to produce an approximate registration of the subsequent frame with the frame under consideration, and
         bi-directionally warping said preceding and subsequent frames to produce refined forward warped and backward warped frames representing approximate registrations of said neighboring frames with the frame under consideration; and
      for each set of corresponding pixels, identifying at least one pixel in the set that represents a trustworthy pixel and employing the pixel color information associated with the one or more identified trustworthy pixels to compute a radiance value for that set of pixels to form a radiance map representing a frame of the HDR video.

3. A computer-implemented process for generating high dynamic range (HDR) video from a video image sequence captured while varying the exposure of each frame, said process comprising:
   a setting step for setting the exposure for each frame of the video image sequence prior to it being captured as a function of the pixel brightness distribution;
   for each frame of the video after a prescribed number of initiating frames,
      an identifying step for identifying corresponding pixels between the frame under consideration and both preceding and subsequent neighboring frames representing a corresponding pixel set, and
      for each set of corresponding pixels, a second identifying step for identifying at least one pixel in the set that represents a trustworthy pixel and an employing step for employing the pixel color information associated with the one or more identified trustworthy pixels to compute a radiance value for that set of pixels to form a radiance map representing a frame of the HDR video, and a tonemapping step for tonemapping the radiance map to convert it into an 8-bit representation suitable for rendering, said tonemapping step comprising,
a converting step for converting the radiance map to CIE space and a recovering step for recovering the chromaticity coordinates to produce a luminance image,
a compressing step for compressing the dynamic range of the luminance image and a re-inserting step for re-inserting the chrominance, and
a second converting step for converting the CIE space image to produce the final 8-bit range RGB image.

* * * * *